United States Patent
Ozawa et al.

(10) Patent No.: US 6,897,635 B2
(45) Date of Patent: May 24, 2005

(54) METHOD FOR PREDICTING REMAINING CHARGE OF PORTABLE ELECTRONICS BATTERY

(75) Inventors: Hidekiyo Ozawa, Kasugai (JP); Shigeo Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 71 days.

(21) Appl. No.: 10/412,427

(22) Filed: Apr. 14, 2003

(65) Prior Publication Data

US 2003/0193318 A1 Oct. 16, 2003

(30) Foreign Application Priority Data

Apr. 15, 2002 (JP) ......................................... 2002-112008

(51) Int. Cl.[7] ........................ H01M 10/44; H01M 10/46
(52) U.S. Cl. ..................................................... 320/127
(58) Field of Search ............................. 320/127, 132, 320/135, 149; 429/90, 91, 92; 324/428, 431, 433

(56) References Cited

U.S. PATENT DOCUMENTS 5,592,095 A * 1/1997 Meadows ................... 324/436
5,864,237 A * 1/1999 Kawai et al. ................ 324/430
6,515,453 B2 * 2/2003 Feil et al. .................... 320/132

FOREIGN PATENT DOCUMENTS

JP          09-269523          10/1997

* cited by examiner

Primary Examiner—Edward H. Tso
(74) Attorney, Agent, or Firm—Arent Fox, PLLC.

(57) ABSTRACT

A remaining charge predicting method which improves the precision of predicting the remaining charge of a rechargeable battery. A battery pack has a measuring circuit which monitors a charge current, discharge current, the voltage of the rechargeable battery and the temperature of the battery. The measuring circuit notifies a power management microcomputer, provided in a portable device, of the measured current, voltage and temperature. The power management microcomputer predicts the remaining charge of the battery based on the received measured values. The battery pack does not perform data processing for predicting the remaining charge.

27 Claims, 15 Drawing Sheets

METHOD FOR PREDICTING REMAINING CHARGE OF PORTABLE ELECTRONICS BATTERY

CROSS-REFERENCE TO RELATED APPLICATION

This application is based upon and claims the benefit of priority from prior Japanese Patent Application No. 2002-112008 filed on Apr. 15, 2002, the entire contents of which are incorporated herein by reference.

BACKGROUND OF THE INVENTION

The present invention relates to a method for predicting remaining charge of a battery, such as a rechargeable battery of a portable electronic device.

In general, chargeable lithium ion batteries are widely used for portable electronic devices, such as notebook personal computers. The lithium ion batteries have advantages such that the operational cost of portable electronic devices can be reduced and the capacity of the current which is instantaneously dischargeable is large. Normally, a machine which has a rechargeable battery so called secondary battery, such as a lithium ion battery, installed therein incorporates a charging circuit which is to be connected to an external power supply to charge the rechargeable battery. To meet the demands for higher performance and size reduction, recent portable devices require a compact charging circuit which can quickly charge a rechargeable battery to a full level. General portable electronic devices include a capability for predicting the remaining charge of a rechargeable battery, when they are in use, in order to avoid problems with data loss by notifying users of the consumption states of the batteries. The prediction of the remaining battery charge should be carried out accurately.

As shown in FIG. 1, an ordinary portable electronic device 101, such as a notebook personal computer (PC); is connected to a battery pack 102 which has a plurality of built-in rechargeable batteries (e.g., lithium ion batteries) 102a and 102b and operates on power from each rechargeable battery 102a or 102b. The portable device 101 is also operable on power which is supplied from an external power supply such as an AC adapter 103.

A power supply unit for the portable device 101 will be discussed below. The portable device 101 includes a power-supply microcomputer 104, a charger 105, a selection circuit 108, first and second DC—DC converters 109 and 110 and a Low Drop Out regulator (LDO) 111 as a switching regulator.

The charger 105, which is connected to the battery pack 102 and the AC adapter 103, supplies a charge voltage and charge current to the rechargeable batteries 102a and 102b in accordance with a control signal from the power-supply microcomputer 104 to charge the rechargeable batteries 102a and 102b with a constant voltage and a constant current.

The selection circuit 108 selects at least one of the battery pack 102 (rechargeable batteries 102a and 102b) and the AC adapter 103. The input voltage from the selected power supply is supplied to the first and second DC—DC converters 109 and 110 and the LDO 111.

The first DC—DC converter 109 generates a supply voltage to be supplied to a CPU (not shown) from the input voltage. The second DC—DC converter 110 generates a supply voltage to be supplied to peripheral circuits (not shown) from the input voltage. The LDO 111 generates a supply voltage for generating a clock signal (not shown) from the input voltage.

The portable device 101 has a remaining-charge predicting capability for predicting the remaining charge of the battery and notifying a user of the predicted remaining charge.

The remaining-charge predicting capability will be discussed below. Generally speaking, lithium ion batteries are susceptible to overdischarging. If a user erroneously overdischarges a lithium ion battery, therefore, the performance of the lithium ion battery may not be recovered if it is charged. To prevent such overdischarging, the battery pack 102 incorporates a protection circuit 112 which detects when the voltage of one of the rechargeable batteries 102a and 102b drops below a specified voltage and stops further discharging. When the protection circuit 112 functions, the supply of the power from the rechargeable battery 102a or 102b to the portable device 101 is stopped and the portable device 101 stops operating. At this time, the portable device 101 such as a notebook PC, may suffer loss of data which is being processed. To avoid such a problem, the portable device 101 predicts the remaining charge of each of the rechargeable battery 102a and 102b and notifies the user of the consumption state of the rechargeable battery.

The prediction of the remaining battery charge is executed in consideration of various characteristics of the rechargeable batteries 102a and 102b (lithium ion batteries) incorporated in the battery pack 102. The following will explain the characteristics of an ordinary lithium ion battery.

FIG. 2A shows a change in discharge characteristic caused by an increase in the number of times a battery set (rechargeable battery) comprising three cells is used (the number of charges/discharges which will be hereinafter called "cycle number"). The vertical scale shows the discharge voltage and the horizontal scale shows the discharge time. A curve A indicates the discharge characteristic with the cycle number being 1 (initial state), and curves B, C and D respectively indicate the discharge characteristics with the cycle number being about 250, about 400 and about 500. A curve E shows the discharge characteristic with the cycle number being about 650. It is apparent from FIG. 2A that as the cycle number increases, the dischargeable capacity of the rechargeable battery decreases, so that the discharge time (usable time) becomes shorter. This phenomenon is called the "cycle degradation characteristic".

In FIG. 2B, the horizontal scale of FIG. 2A has been normalized. The horizontal scale indicates the discharge capacity and shows the end time at 100% discharge. FIG. 2B shows that the rate of voltage reduction of the rechargeable battery is nearly constant irrespective of the cycle number.

The cycle life characteristic of the rechargeable battery will be discussed below.

FIG. 3 shows the relationship between the cycle number and the discharge capacity which have been measured for three kinds of rechargeable batteries. The discharge capacity of the rechargeable battery decreases as the cycle number increases. For example, a curve F indicates that the discharge capacity when the cycle number is 600 (the capacity at the time of full charge) has dropped to about 30 to 40% of the maximum capacity.

The following will discuss the degradation characteristic of the rechargeable battery which varies according to the environment of use.

A curve H in FIG. 4 shows the characteristic of the rechargeable battery that has been left out for one month at 45° C., and a curve G shows the characteristic of the rechargeable battery before it has been subjected to the foregoing treatment. The discharge time (use time) of the rechargeable battery varies also depending on the temperature at which it has been used.

FIG. 5 is an explanatory diagram showing the relationship between the discharge power and dischargeable capacity at different temperatures of use for two kinds of rechargeable batteries. Curves I to K respectively show the characteristics when one type of rechargeable battery is used at 5° C., 25° C. and 45° C. Curves L to N respectively show the characteristics when the other rechargeable battery is used at 5° C., 25° C. and 45° C.

The rechargeable battery that is indicated by the curve I for use temperature of 5° C. can be used for about 2.8 hours with a discharge power of 10 W. The rechargeable battery of the same kind that is indicated by the curve K for use temperature of 45° C. can be used for about 3.2 hours with a discharge power of 10 W. The rechargeable battery of the other kind that is indicated by the curve L for use temperature of 5° C. can be used for about 2.8 hours with a discharge power of 10 W. The rechargeable battery of the same kind that is indicated by the curve N for use temperature of 45° C. can be used for about 3.1 hours with a discharge power of 10 W. Apparently, the dischargeable capacity of the rechargeable battery varies depending on the type, the use temperature and the discharge power.

The prediction of the remaining charge of a rechargeable battery has been carried out conventionally in consideration of the aforementioned various characteristics. The remaining charge predicting methods include a method for predicting the remaining charge based on, for example, the battery voltage of the rechargeable battery and a method for predicting the remaining charge based on the integrated values of the charge current and discharge current of the rechargeable battery.

FIG. 6 is a schematic diagram of a portable device 121 and a battery pack 122 according to a first prior art system that is equipped with a remaining charge predicting function.

The portable device 121 is, for example, a notebook PC. The portable device 121 has a built-in battery pack 122 called a smart battery or an intelligent battery.

The battery pack 122 includes plural (three) rechargeable batteries 122a to 122c, a protection circuit 123, a discharge control switch 124, a charge control switch 125, a remaining charge meter 126 as a remaining charge predicting device, an electrically erasable and programmable read only memory (EEPROM) 127 and a first sense resistor 128. FIG. 6 shows only a part of the portable device 121 that actually includes a second sense resistor 129, a charger 130 and a microcomputer 131, for example, a keyboard, which is one type of microcomputer.

The rechargeable batteries 122a to 122c, each of which is, for example, a lithium ion battery, are connected in series to one another to form a battery set. The positive terminal of the rechargeable battery 122a is connected to the positive terminal, t1, of the battery pack 122 via the discharge control switch 124, the charge control switch 125 and the first sense resistor 128, and the negative terminal of the rechargeable battery 122c is connected to the negative terminal, t2, of the battery pack 122. The discharge control switch 124 and the charge control switch 125 are formed by first and second P channel MOS transistors. The source of the discharge control switch 124 is connected to the positive terminal of the rechargeable battery 122a. The drains of both switches 124 and 125 are connected together. The source of the charge control switch 125 is connected to the positive terminal t1 of the battery pack 122 via the first sense resistor 128. The transistors of both switches 124 and 125 are connected in such a way that the back gates constitute a forward-biased diode with respect to the charge current and the discharge current.

The protection circuit 123 includes an overcharge preventing circuit and overdischarge preventing circuit (neither shown). The protection circuit 123 detects the terminal voltages (cell voltages) of the rechargeable batteries 122a to 122c and turns off the discharge control switch 124 to inhibit discharging when at least one of the cell voltages decreases to or below the specified voltage or reaches an overdischarge state. When at least one of the cell voltages rises above the specified voltage or reaches an overcharge state, on the other hand, the protection circuit 123 turns off the charge control switch 125 to inhibit charging.

At the time of charging, the charge current is supplied to the rechargeable batteries 122a to 122c via the charge control switch 125 which has been turned on and the discharge control switch 124. The charger 130 of the portable device 121 is connected to an AC adapter 132 connected to an external power supply. The charger 130 controls the charge current based on the value of the current that flows across the second sense resistor 129.

At the time of discharging, each of the rechargeable batteries 122a to 122c supplies the discharge current to the portable device 121 via the discharge control switch 124 which has been turned on and the charge control switch 125.

The remaining charge meter 126 includes a microcomputer (not shown) which measures the charge current/discharge current that flows across the first sense resistor 128 and predicts the remaining charge based on the integral value of that measured current and each cell voltage detected by the protection circuit 123. The remaining charge meter 126 stores the predicted remaining charge in the EEPROM 127 and supplies the predicted remaining charge to the keyboard microcomputer 131 provided in the portable device 121. When receiving the predicted value for the remaining charge from the remaining charge meter 126, the keyboard microcomputer 131 displays the remaining battery charge on an unillustrated display unit.

FIG. 7 shows a second prior art system equipped with a remaining charge predicting function.

A portable device 141 is, for example, a notebook PC. The portable device 141 has a built-in battery pack 142. According to the second prior art, the battery pack 142 differs from the battery pack in FIG. 6 in that it has a integrating current meter 143 as a remaining charge predicting device.

The integrating current meter 143 measures the charge current/discharge current that flows across the first sense resistor 128 and supplies a current integrated value to a power management microcomputer 144 of the portable device 141. Then, the power management microcomputer 144 calculates a remaining charge predicted value based on the current integrated value output from the integrating current meter 143 and displays the remaining battery charge on an unillustrated display unit based on the predicted value.

These prior art systems have the following shortcomings:
1. Shortcoming Pertaining to Prediction of Remaining Charge In the first prior art system shown in FIG. 6, the remaining charge meter 126 calculates a remaining charge predicted value based on the cell voltage of each of the rechargeable batteries 122a to 122c and the integrated values of the charge current and discharge current and supplies the predicted value to the portable device 121. While this ensures highly precise prediction of the remaining charge, the manufacturing cost for the battery pack 122 increases due to the microcomputer provided in the remaining charge meter 126. This makes the battery pack 122 expensive.

In the second prior art system shown in FIG. 7, on the other hand, because the battery pack 142 is not equipped with a microcomputer, an increase in the manufacturing cost for the battery pack 142 is nit incurred. However, in the battery pack 142, the integrating current meter 143 predicts the remaining charge of the rechargeable battery only by detecting the current value. As shown in FIG. 3, when the cycle number of the rechargeable battery increases, the discharge capacity decreases, so that mere prediction of the remaining charge based on current integration would result in inaccurate prediction of the remaining charge. In a case where the battery pack 142 incorporates plural rechargeable batteries 122a to 122c, particularly, their capacities (terminal voltages) vary, thus lowering the precision of the prediction of the remaining charge.

2. Charge-Oriented Shortcoming

In the first prior art system, the charger 130 detects the charge current that flows across the second sense resistor 129 and charges the rechargeable batteries 122a to 122c with the constant voltage and constant current based on the detection result. To precisely perform such charging with the constant voltage and constant current, it is necessary to improve the precision of the current detection done by the charger 130. In this respect, normally, a sense resistor of a high precision type is used as the second sense resistor 129 that is provided to detect the current. This disadvantageously increases the manufacturing cost for the charger 130. Further, such a high precision type resistor is large in size, which undesirably enlarges the charger 130. This shortcoming also arises in the second prior art system.

SUMMARY OF THE INVENTION

One aspect of the present is a method for predicting remaining charge in at least one rechargeable battery provided in a battery pack for supplying power to a portable device. The method includes measuring current flowing into or flowing out of said rechargeable battery and voltage of said rechargeable battery using a measuring unit provided in said battery pack, and predicting remaining charge based on results of measuring said current and said voltage using a data processing unit provided in said portable device.

A further perspective of the present invention is a method for controlling charging of a rechargeable battery provided in a battery pack to be connected to a portable device. The method includes measuring charge current and charge voltage to be supplied to said battery pack from an external power supply using a charger provided in said portable device, measuring current flowing into said rechargeable battery using a measuring unit provided in said battery pack, notifying said portable device of a result of measuring said current flowing into said rechargeable battery, and controlling said charge voltage and said charge current to be constant based on results of measuring said charge current and said charge voltage and said result of measuring said current flowing into said rechargeable battery.

A further perspective of the present invention is a method for controlling charging of a rechargeable battery provided in a battery pack which is connectable to a portable device and includes a first terminal for supplying charge current and charge voltage to said rechargeable battery from an external power supply and a second terminal for outputting a signal having a voltage nearly equal to a battery voltage of said rechargeable battery. The method includes measuring charge current flowing into said first terminal using a charger provided in said portable device, measuring a voltage difference between a voltage at said first terminal and a voltage at said second terminal using said charger, measuring current flowing into said rechargeable battery using a measuring unit provided in said battery pack, and controlling said charge voltage and said charge current to be constant, by using said portable device, based on results of measuring said current flowing into said rechargeable battery, said charge current and said voltage difference.

A further perspective of the present invention is a method for controlling a power supply of a portable device which has a standby power supply and is connected to a battery pack including at least one rechargeable battery, a first terminal for supplying power from said rechargeable battery to said portable device and a second terminal for outputting a signal having a voltage nearly equal to a battery voltage of said rechargeable battery. The method includes cutting off supply of power to said portable device when said portable device is in a standby mode, and supplying an enable signal to enable said standby power supply to said standby power supply via said second terminal.

A further perspective of the present invention is a battery pack having at least one rechargeable battery. The battery pack includes a current detection circuit for detecting a current flowing into or flowing out of said rechargeable battery and generating an analog current detection signal. A voltage detection circuit detects a voltage of said rechargeable battery and generating an analog voltage detection signal. An analog-digital conversion circuit is connected to said current detection circuit and voltage detection circuit and converts said current detection signal and said voltage detection signal to digital signals. An interface outputs said digital signals.

A further perspective of the present invention is a semiconductor device used in a battery pack having at least one rechargeable battery. The device includes a current detection circuit for detecting a current flowing into or flowing out of said rechargeable battery and generating an analog current detection signal, a voltage detection circuit for detecting a voltage of said rechargeable battery and generating an analog voltage detection signal, and an analog-digital conversion circuit connected to said current detection circuit and said voltage detection circuit, for converting said current detection signal and said voltage detection signal to digital signals.

A further perspective of the present invention is a portable device which is driven by power supplied from a battery pack. The battery pack includes a rechargeable battery, a current detection circuit for detecting a current flowing into or flowing out of said rechargeable battery and generating an analog current detection signal, a voltage detection circuit for detecting a voltage of said rechargeable battery and generating an analog voltage detection signal, an analog-digital conversion circuit, connected to said current detection circuit and said voltage detection circuit, for converting said current detection signal and said voltage detection signal to digital signals, and an interface for outputting said digital signals. The portable device includes a power-supply terminal to be connected to said battery pack, and a data processing unit for receiving said digital signals via said interface and predicting remaining charge of said rechargeable battery using said digital signals.

A further perspective of the present invention is a method for manufacturing an apparatus for predicting remaining charge of at least one rechargeable battery provided in a battery pack for a portable device. The method includes providing said battery pack with a measuring unit for measuring current flowing into or flowing out of said rechargeable battery and a voltage of said rechargeable battery, and providing said portable device with a data processing unit for predicting said remaining charge of said at least one rechargeable battery based on results of measuring said current and said voltage, which are output from said measuring unit.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will be described below.

Figure 1:
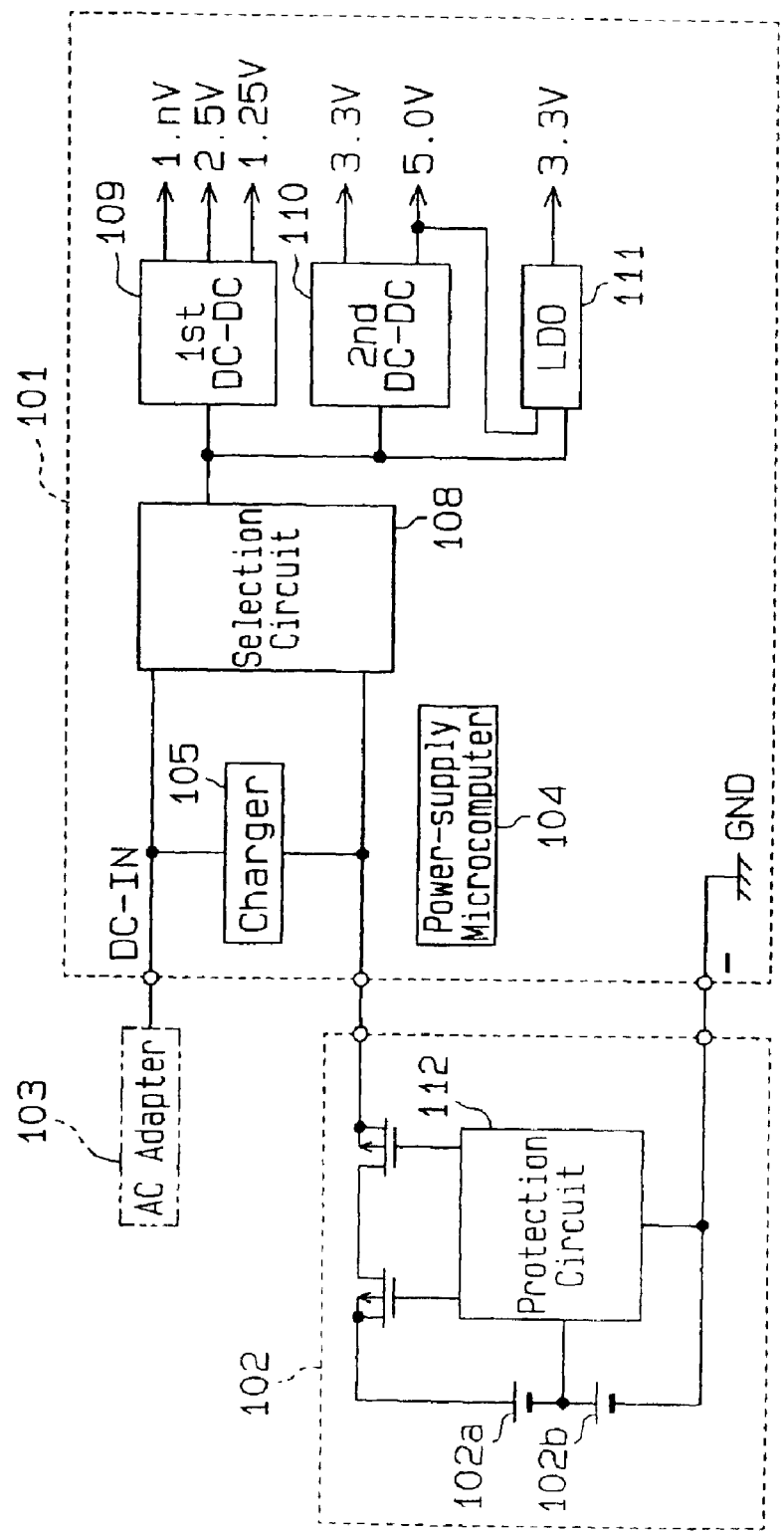
FIG. 1 is a schematic block circuit diagram of an ordinary portable electronic device connected to a battery pack.
Figure 2A:
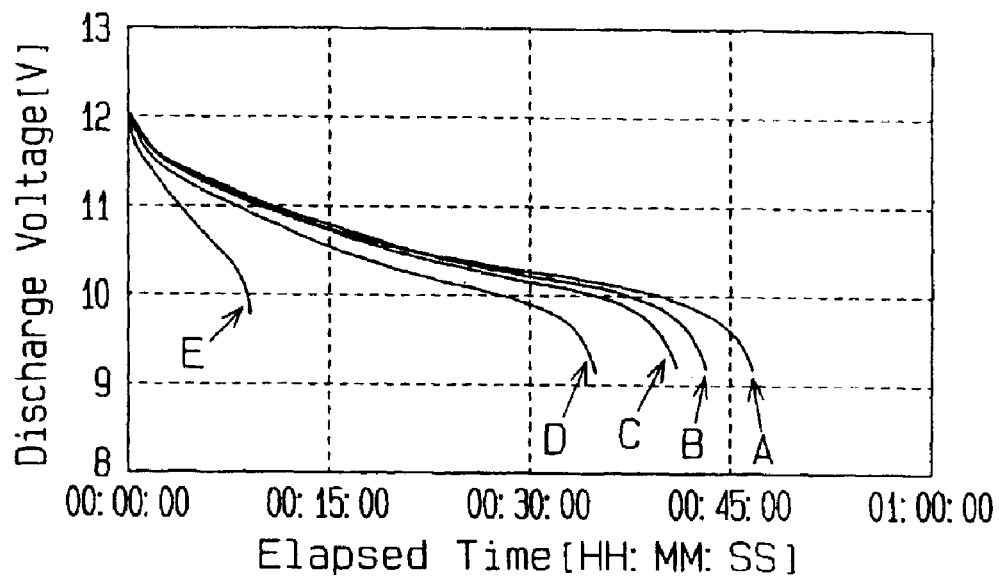
FIGS. 2A, 2B, 3, 4 and 5 are graphs showing the characteristics of rechargeable batteries.
Figure 2B:
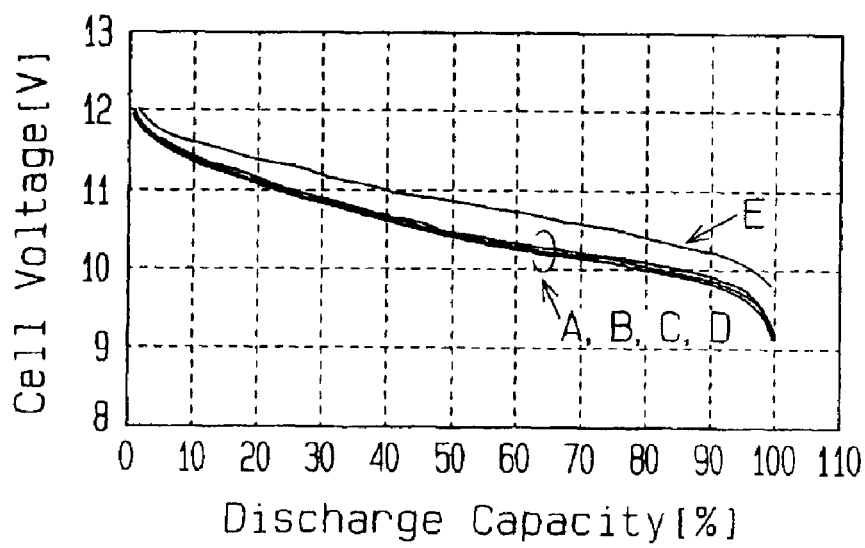
Figure 3:
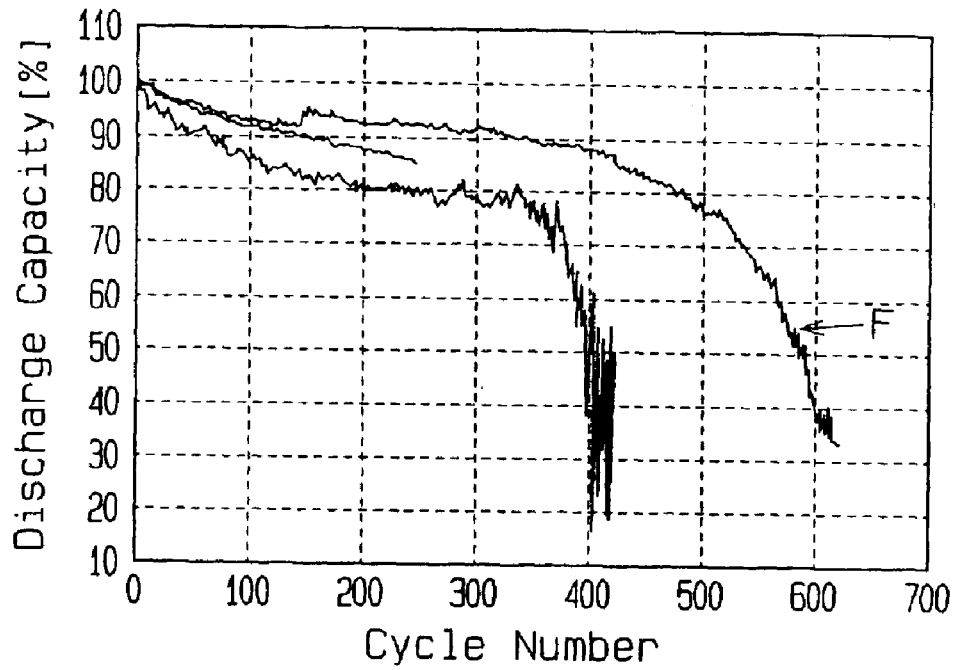
Figure 4:
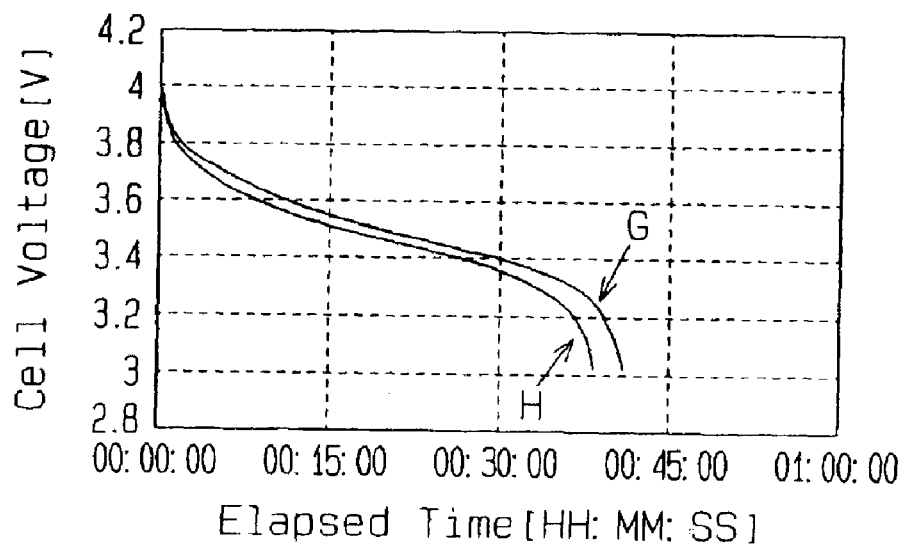
Figure 5:
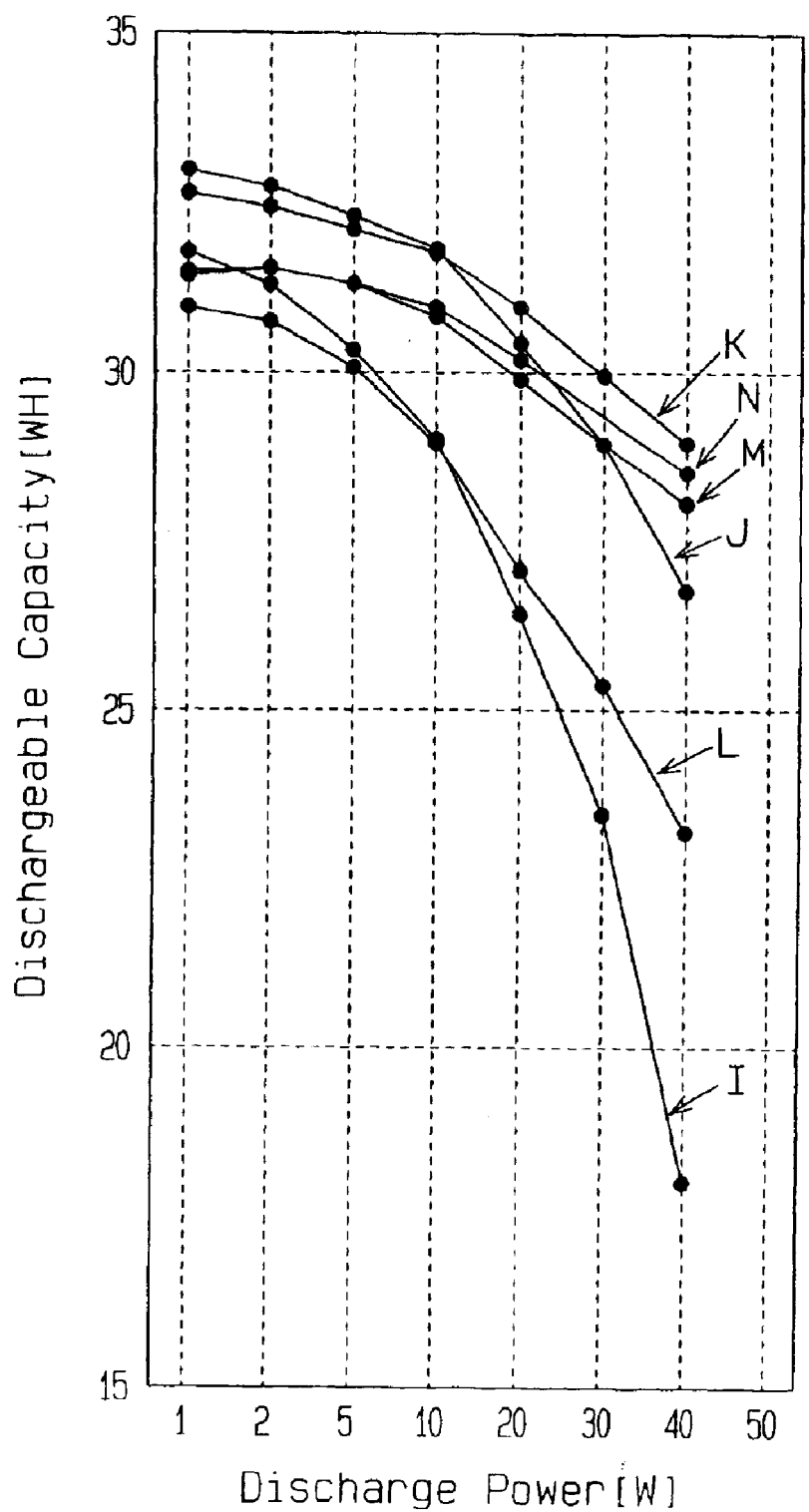
Figure 6:
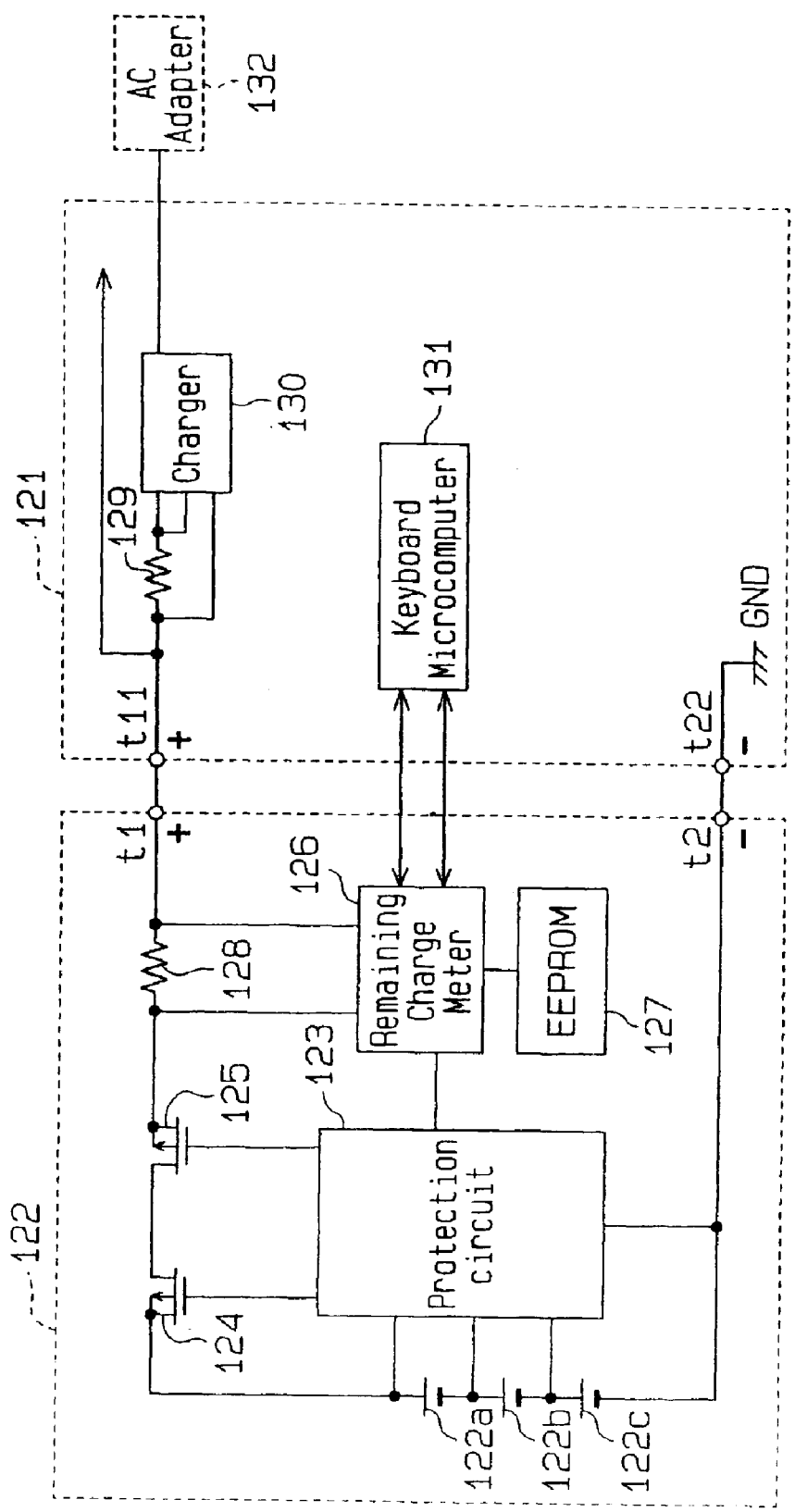
FIG. 6 is a schematic block circuit diagram of a portable electronic device according to a first prior art system.
Figure 7:
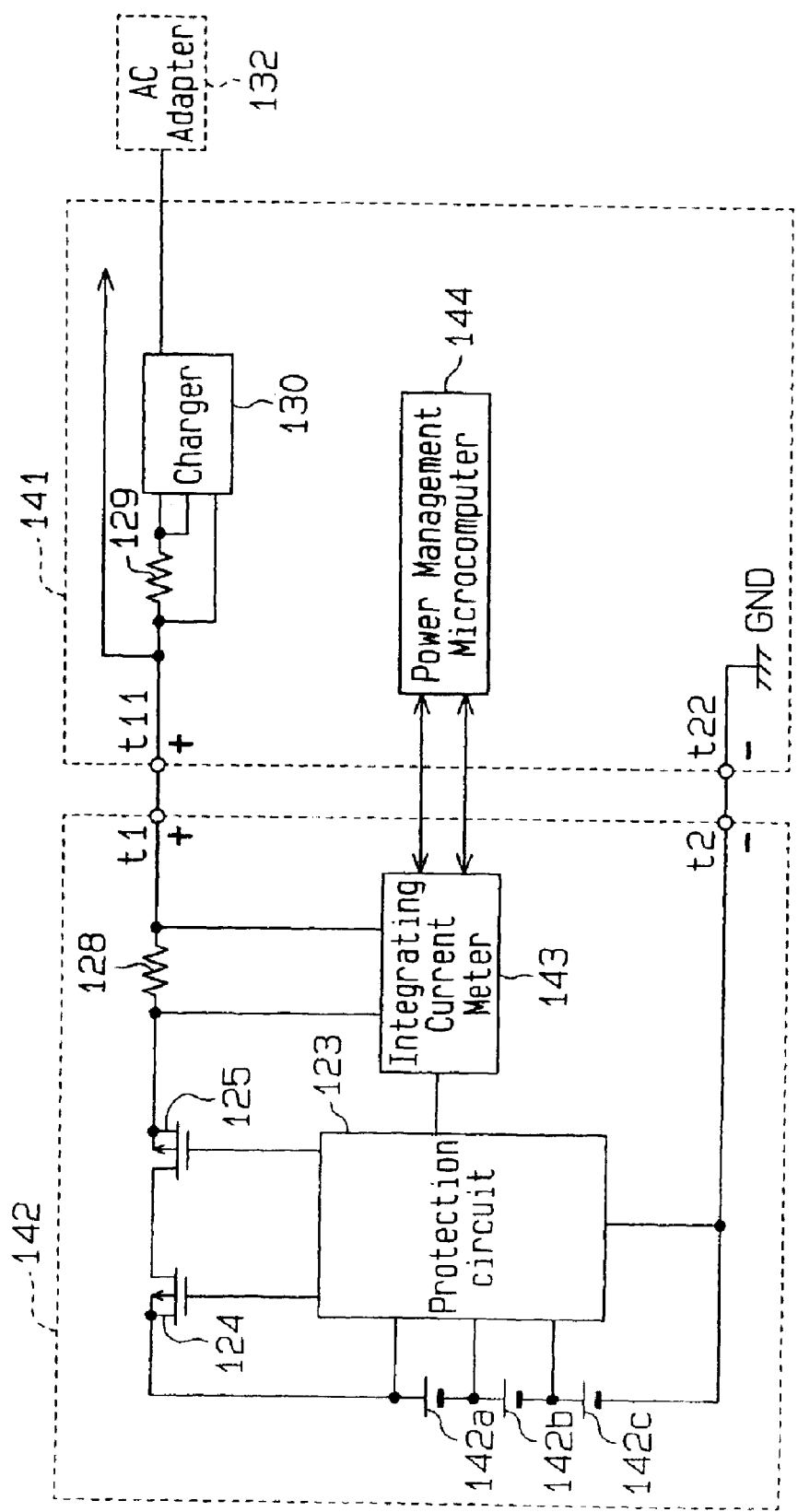
FIG. 7 is a schematic block circuit diagram of a portable electronic device according to a second prior art system.
Figure 8:
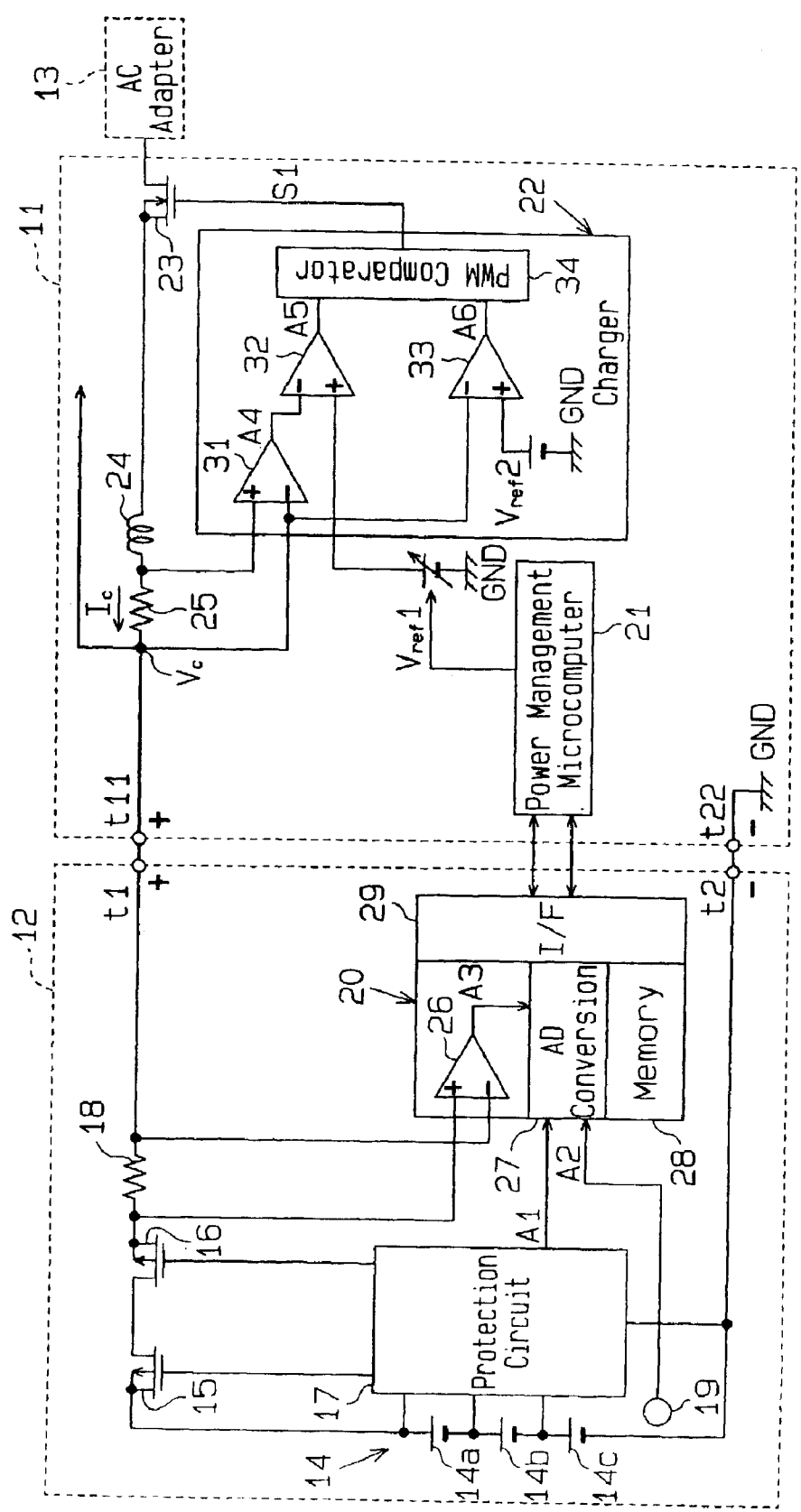
FIG. 8 is a schematic block circuit diagram of a battery pack and a portable electronic device according to a first embodiment of the present invention.

FIG. 8 is a schematic block circuit diagram of a battery pack 12 and a portable electronic device 11 according to the first embodiment.

The portable device 11, connected to the battery pack 12, is driven by the battery pack 12. The portable device 11 is connectable to an external power supply via an AC adapter 13.

The battery pack 12 has a battery 14, a discharge control switch 15, a charge control switch 16, a protection circuit 17, a first sense resistor 18, a temperature sensor 19 as a temperature detection circuit and a measuring circuit 20 (measuring unit). The portable device 11 includes a power management microcomputer 21 as a data processing unit, a charger 22, an output switch 23, a coil 24 and a second sense resistor 25. FIG. 8 shows a part of a power supply unit for the portable device 11.

The battery 14 of the battery pack 12 consists of at least one rechargeable battery (for example, three rechargeable batteries (cells) 14a to 14c). Each of the rechargeable batteries 14a to 14c is a lithium ion battery, for example. The positive terminal of the rechargeable battery 14a is connected to the positive terminal, t1, of the battery pack 12 as a first terminal via the discharge control switch 15, the charge control switch 16 and the first sense resistor 18. The positive terminal t1 is connected to the positive terminal, t11, of the portable device 11. The negative terminal of the rechargeable battery 14a is connected to the negative terminal, t2, of the battery pack 12. The negative terminal t2 is connected to the negative terminal, t22, of the portable device 11.

The discharge control switch 15 and the charge control switch 16 are formed by P channel MOS transistors. Both switches 15 and 16 have drains connected together and gates connected to the protection circuit 17. The source of the discharge control switch 15 is connected to the positive terminal of the rechargeable battery 14a, and the source of the charge control switch 16 to the first sense resistor 18. The transistors of both switches 15 and 16 are-connected in such a way that the back gates form a forward-biased diode with respect to the charge current and the discharge current.

The protection circuit 17 serves as a voltage detection circuit which detects the terminal voltage (cell voltage) of each of the rechargeable batteries 14a to 14c, and supplies a voltage detection signal A1 corresponding to the detected voltage to the measuring circuit 20. The protection circuit 17 performs the ON/OFF actions of the discharge control switch 15 and the charge control switch 16 in accordance with the cell voltage. When the protection circuit 17 turns on the discharge control switch 15, for example, the rechargeable batteries 14a to 14c can discharge with respect to the portable device 11. When the protection circuit 17 turns on the charge control switch 16, on the other hand, the portable device 11 can charge the rechargeable batteries 14a to 14c.

The protection circuit 17 includes an overdischarge preventing circuit (not shown), which prevents overdischarging of the rechargeable batteries 14a to 14c, and an overcharge preventing circuit (not shown), which prevents overcharging. When the cell voltage of at least one of the rechargeable batteries 14a to 14c decreases to a specified voltage or lower, the overdischarge preventing circuit turns off the discharge control switch 15 to inhibit discharging. When the cell voltage of at least one of the rechargeable batteries 14a to 14c increases to a specified voltage or higher, the overcharge preventing circuit turns off the charge control switch 16 to inhibit charging. Accordingly, the protection circuit 17 prevents the performance of the rechargeable batteries 14a to 14c from decreasing.

The temperature sensor 19 detects the temperature of the battery 14 and supplies a temperature detection signal A2 corresponding to the temperature to the measuring circuit 20. The temperature sensor 19 may detect the temperature of each of the rechargeable batteries 14a to 14c.

The measuring circuit 20 includes an amplification circuit for current detection (current detection circuit) 26, an analog-to-digital (AD) conversion circuit 27, a rewritable non-volatile memory 28 and an interface (I/F) circuit 29.

The current detection circuit 26 has an inverting input terminal (−) connected to the high-voltage terminal of the first sense resistor 18 and a non-inverting input terminal (+) connected to the low-voltage terminal of the resistor 18. The current detection circuit 26 detects the current that flows out of the first sense resistor 18 (the discharge current of the battery 14 or the charge current that is supplied from the portable device 11) and supplies a current detection signal A3 according to that current value to the AD conversion circuit 27. Specifically, the current detection circuit 26 measures the voltages at both ends of the first sense resistor 18 and generates the current detection signal A3 corresponding to the difference between both voltages. When the discharge current or the charge current that flows across the first sense resistor 18 increases, therefore, the level of the current detection signal A3 is set higher, and when the current decreases, on the other hand, the level of the current detection signal A3 is set lower.

The AD conversion circuit 27 receives the voltage detection signal A1 from the protection circuit 17, the temperature detection signal A2 from the temperature sensor 19 and the current detection signal A3 from the current detection circuit 26. The detection signals A1 to A3 are analog signals which are to be converted to digital signals by the AD conversion circuit 27. The digital signals are supplied to the power management microcomputer 21 equipped in the portable device 11 via the I/F circuit 29.

The power management microcomputer 21 receives a digital value output from the measuring circuit 20 as a measured value for prediction of the remaining charge and displays the remaining battery charge on an unillustrated display unit in accordance with a remaining charge predicted value which is calculated based on that measured value. Each time prediction of the remaining charge is executed, the power management microcomputer 21 stores the remaining charge predicted value calculated in that prediction and data pertaining to the present states of usage of the rechargeable batteries 14a to 14c (such as the amount of the discharge current, the total use time and the cycle number) in the memory 28 in the measuring circuit 20. In the first embodiment, although the power management microcomputer 21 performs prediction of the remaining charge, the data processing unit is not limited to the power management microcomputer 21. For example, another microcomputer provided in the portable device 11 may carry out prediction of the remaining charge.

The charger 22 includes an amplification circuit for current detection (current detection circuit) 31, an error amplification circuit 32, an amplification circuit for voltage detection (voltage detection circuit) 33 and a pulse width modulation (PWM) comparator 34.

The current detection circuit 31 has an inverting input terminal connected to the low-voltage terminal of the second sense resistor 25 and a non-inverting input terminal connected to the high-voltage terminal of the resistor 25. The current detection circuit 31 detects a charge current $I_c$ to be supplied to the battery 14 from the AC adapter 13 at the time of charging, and supplies a current detection signal A4 corresponding to the value of the current $I_c$. Specifically, the current detection circuit 31 measures the voltages at both ends of the second sense resistor 25 and generates the current detection signal A4 corresponding to the difference between both voltages. When the charge current $I_c$ increases, the level of the current detection signal A4 is set higher, and when the charge current $I_c$ decreases, on the other hand, the level of the current detection signal A4 is set lower.

The current detection signal A4 from the current detection circuit 31 is input to the inverting input terminal of the error amplification circuit 32 and a first reference voltage $V_{ref1}$ is input to the non-inverting input terminal of the circuit from the power management microcomputer 21. The value of the first reference voltage $V_{ref1}$ is variably controlled by the power management microcomputer 21. The power management microcomputer 21 determines the first reference voltage $V_{ref1}$ in accordance with the current measured value from the measuring circuit 20. The error amplification circuit 32 compares the first reference voltage $V_{ref1}$ with the current detection signal A4, generates an error signal A5 which is the difference between both voltages amplified, and supplies the error signal A5 to the PWM comparator 34.

The inverting input terminal of the voltage detection circuit 33 is connected to the low-voltage terminal of the second sense resistor 25, and a charge voltage $V_c$ to be supplied to the battery 14 from the AC adapter 13 is input to that inverting input terminal. A second reference voltage $V_{ref2}$ is supplied to the non-inverting input terminal of the voltage detection circuit 33. The voltage detection circuit 33 compares the charge voltage $V_c$ with the second reference voltage $V_{ref2}$, amplifies the difference between both voltages to generate a voltage detection signal A6 and supplies the voltage detection signal A6 to the PWM comparator 34.

The PWM comparator 34 receives a triangular wave signal from an unillustrated triangular wave oscillation circuit, compares the level of the triangular wave signal with the level of the error signal A5 or the level of the voltage detection signal A6, whichever is lower, and generates a pulse signal S1 having a level corresponding to the comparison result. For example, in a period where the level of the triangular wave signal is greater than that of the signal A5 or A6, the PWM comparator 34 generates the pulse signal S1 of an L level, whereas in a period where the level of the triangular wave signal is smaller than that of the signal A5 or A6, the PWM comparator 34 generates the pulse signal S1 of an H level.

The output switch 23 is an N channel MOS transistor whose gate is supplied with the pulse signal S1 from the PWM comparator 34. The output switch 23 has a source connected to the coil 24 and a drain connected to the AC adapter 13. The ON/OFF action of the output switch 23 is controlled based on the pulse signal S1 output from the PWM comparator 34 in such a way that the charge current $I_c$ and the charge voltage $V_c$ from the AC adapter 13 become constant at predetermined values based on the switching operation.

Figure 9:
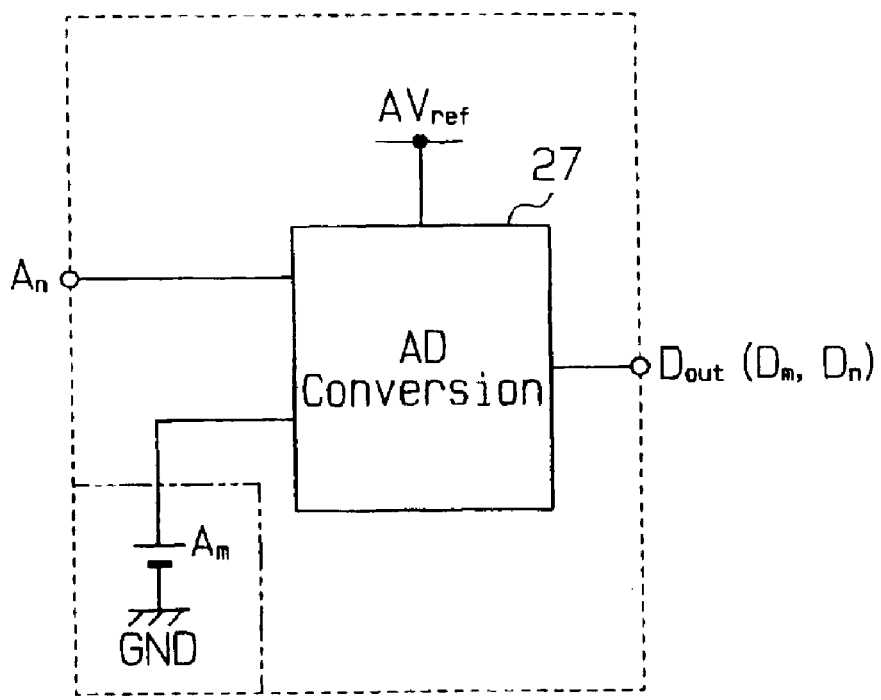
FIG. 9 is a schematic block circuit diagram of an AD conversion circuit in FIG. 8.

As shown in FIG. 9, an analog power supply voltage $AV_{ref}$ and plural (only one shown in FIG. 9 for simplicity) analog input signals $A_n$ to be measured are input to the AD conversion circuit 27. The analog voltage $AV_{ref}$ may be generated inside the AD conversion circuit 27 or may be supplied from an external circuit. Likewise, a reference voltage $A_m$ may be supplied from an external circuit as indicated by the two-dot chain line or may be generated inside the AD conversion circuit 27 as indicated by the broken line.

The analog input signal $A_n$ is, for example, the voltage detection signal A1 supplied from the protection circuit 17, the temperature detection signal A2 supplied from the temperature sensor 19 or the current detection signal A3 supplied from the current detection circuit 26. The input voltage range of the AD conversion circuit 27 covers, for example, the analog voltage $AV_{ref}$ and the analog ground, and the AD conversion circuit 27 performs analog-digital conversion of the reference voltage $A_m$ and the analog input signal $A_n$ to generate digital values $D_m$ and $D_n$, respectively, and outputs the digital values from an output terminal $D_{out}$.

Figure 11A:
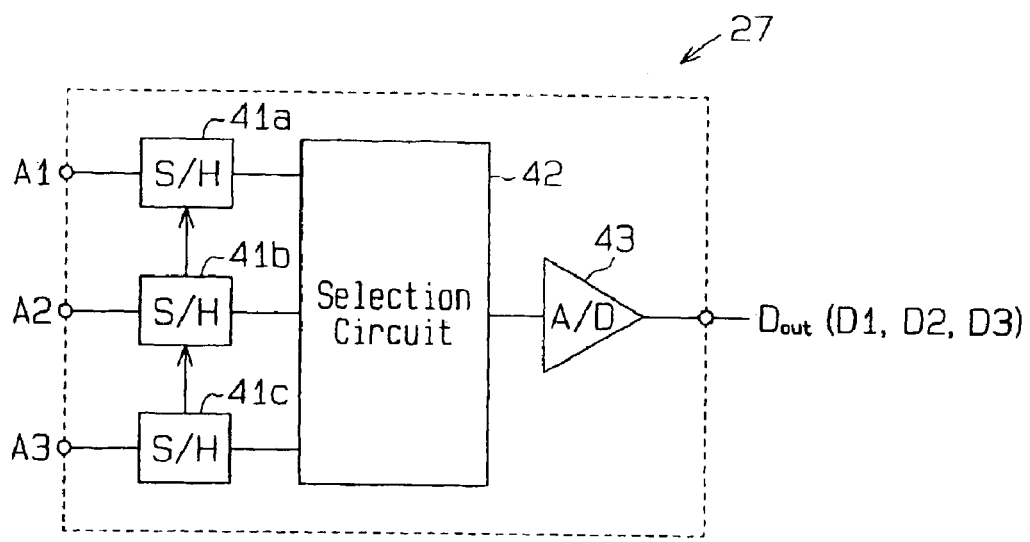
FIGS. 11A and 11B are detailed block circuit diagrams of the AD conversion circuit.
Figure 11B:
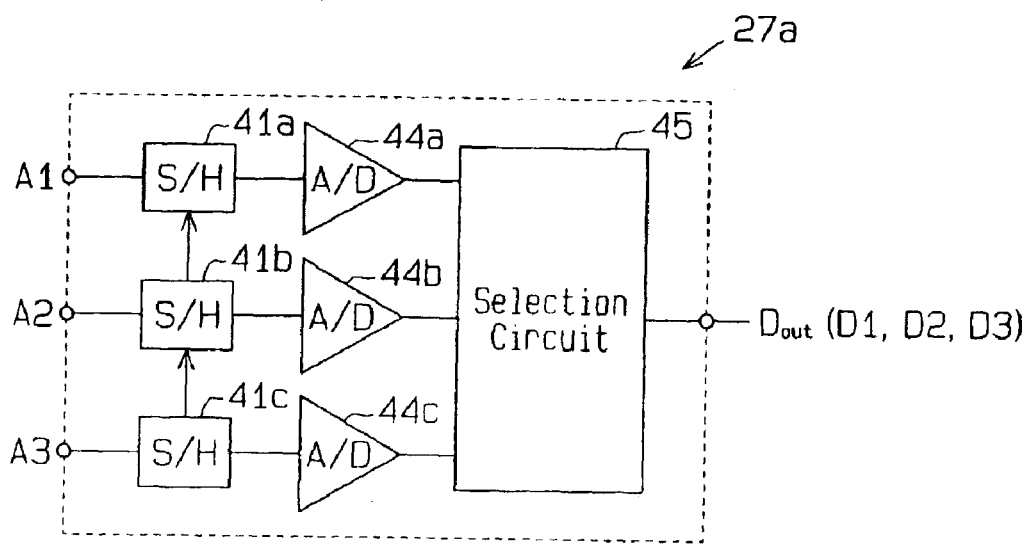

FIGS. 11A and 11B are block circuit diagrams of the AD conversion circuit 27. FIGS. 11A and 11B do not show the analog voltage $AV_{ref}$ and the reference voltage $A_m$. The voltage detection signal A1, the temperature detection signal A2 and the current detection signal A3 correspond to the analog input signals $A_n$.

As shown in FIG. 11A, the AD conversion circuit 27 includes sampling and holding (S/H) circuits 41a, 41b and 41c which respectively sample the analog values of the voltage detection signal A1, the temperature detection signal A2 and the current detection signal A3, a selection circuit 42 connected to the S/H circuits 41a to 41c and an AD converter unit 43 connected to the selection circuit 42.

The S/H circuits 41a to 41c supply the selection circuit 42 with the analog values (hereinafter called "sampling values") of the detection signals A1 to A3 simultaneously sampled and held in accordance with an unillustrated clock signal. The selection circuit 42 sequentially supplies the sampling values to the AD converter unit 43. The AD converter unit 43 performs analog-digital conversion on the input sampling values sequentially to generate digital values D1 to D3.

Because a plurality of analog input signals $A_n$ to be measured (i.e., the detection signals A1 to A3) are simultaneously sampled by the plural S/H circuits 41a to 41c, respectively provided, in this AD conversion system, the sampling precision is improved. As a result, the measuring circuit 20 shown in FIG. 8 can measure the voltage, current and temperature accurately.

The AD conversion circuit 27 in FIG. 11A may be modified as shown in FIG. 11B. In this case, the following AD conversion system is carried out.

An AD conversion circuit 27a in FIG. 11B includes S/H circuits 41a to 41c which simultaneously sample the detection signals A1 to A3, AD converters 44a to 44c provided in association with the S/H circuits 41a to 41c, and a selection circuit 45 connected to the AD converters 44a to 44c. In the AD conversion circuit 27a, the sampling values of the detection signals A1 to A3 simultaneously sampled are respectively connected to the AD converters 44a to 44c. The AD converters 44a to 44c perform analog-digital conversion on the sampling values at a time and supply resultant digital values to the selection circuit 45. The selection circuit 45 sequentially outputs the digital values D1 to D3. The AD conversion circuit 27a improves the sampling precision and allows the measuring circuit 20 to measure the voltage, the current and the temperature more accurately.

Figure 10:
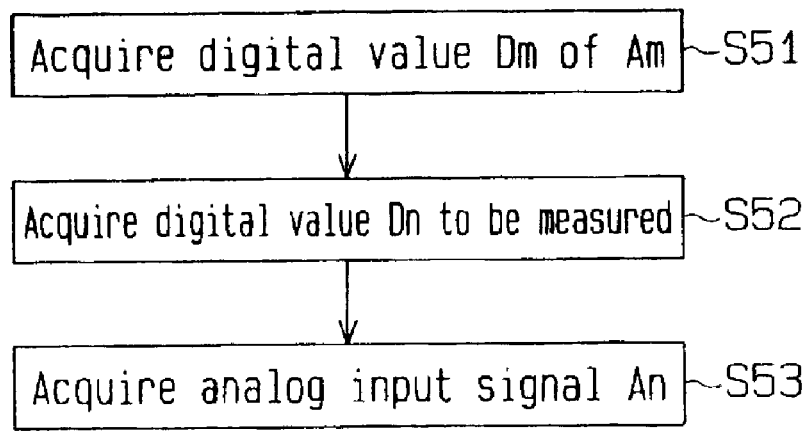
FIG. 10 is a flowchart for explaining an AD conversion system.

FIG. 10 is a flowchart for explaining the AD conversion system according to the first embodiment.

In step S51, the AD conversion circuit 27 performs analog-digital conversion on the reference voltage $A_m$ to generate the digital value $D_m$ with the analog voltage $AV_{ref}$ and the analog ground as the input voltage range and outputs the digital value $D_m$.

In step S52, the AD conversion circuit 27 performs analog-digital conversion on the analog input signal $A_n$ (the voltage detection signal A1, temperature detection signal A2 or current detection signal A3) to be measured to generate the digital value $D_n$ with the analog voltage $AV_{ref}$ and the analog ground as the input voltage range and outputs the digital value $D_n$.

In step S53, the power management microcomputer 21 calculates the measured input value of the analog input signal $A_n$ based on the digital values $D_m$ and $D_n$ and the prestored reference voltage $A_m$.

In this AD conversion system, the analog input signals $A_n$ (the voltage value, current value and temperature) are calculated based on the reference voltage $A_m$ given to the AD conversion circuit 27, irrespective of the analog voltage $AV_{ref}$ supplied to the AD conversion circuit 27.

In a case where the AD conversion circuit 27 outputs a digital signal of 10 bits, for example, the reference voltage $A_m$ is calculated from the digital value $D_m$ and the input voltage range (the value of the analog voltage $AV_{ref}$ in the above case) according to an equation 1.

$$A_m = (D_m/1024) \times AV_{ref} \quad (1)$$

The value of the analog input signal $A_n$ is calculated from the digital value $D_n$ and the input voltage range according to an equation 2.

$$A_n = (D_n/1024) \times AV_{ref} \quad (2)$$

The value of the analog input signal $A_n$ is calculated according to an equation 3 using the results of calculations in the equations 1 and 2.

$$A_n = (D_n/D_m) \times A_m \quad (3)$$

If the reference voltage $A_m$ is known, therefore, the value of the analog input signal $A_n$ can be acquired from the digital value $D_m$ of the reference voltage $A_m$ and the digital value $D_n$ of the analog input signal $A_n$, regardless of the analog voltage $AV_{ref}$.

In general, at the time of obtaining the value of the analog input signal $A_n$, the value of the analog voltage $AV_{ref}$ is known at the time of designing the LSI, then equation 2 alone only needs to be used. In that case, however, the analog voltage $AV_{ref}$ should be matched with the designed value accurately. In a case where the analog voltage $AV_{ref}$ is designed to be 3 V, for example, the actual analog voltage $AV_{ref}$ which is supplied to the AD conversion circuit should be set exactly to 3 V. Because the power supply circuit that generates such an accurate analog voltage $AV_{ref}$ requires many circuit elements, the cost for the LSI increases.

Equation 3, on the other hand, does not require the value of the analog voltage $AV_{ref}$. What is desired for the analog voltage $AV_{ref}$ is that it is stable during AD conversion of the reference voltage $A_m$ and the analog input signal $A_n$. Such a stable power supply circuit has fewer circuit elements than the high-precision power supply circuit and is therefore less expensive.

According to the first embodiment, therefore, the AD conversion circuit 27 does not require a high-precision analog power supply circuit for performing analog-digital conversion, i.e., does not require the precision of the analog voltage $AV_{ref}$. This can allow the AD conversion circuit 27 to be constructed easily and at a low cost.

The operation of the portable device 11 will be discussed below.

To begin with, the remaining charge predicting system will be elaborated.

The measuring circuit 20 of the battery pack 12 detects the charge current that flows into the battery 14 (rechargeable batteries 14a to 14c) or the discharge current that flows out of the battery 14, generates a current measured value by performing analog-digital conversion on the detected current, and supplies the current measured value to the power management microcomputer 21. The measuring circuit 20 performs analog-digital conversion on the voltage value detected by the protection circuit 17 and the temperature detected by the temperature sensor 19, thereby generating a voltage measured value and a temperature measured value, and supplies the voltage measured value and temperature measured value to the power management microcomputer 21.

The power management microcomputer 21 calculates the remaining charge predicted value based on the measured values received from the measuring circuit 20 and displays the computation result on the unillustrated display unit. Further, the power management microcomputer 21 stores the remaining charge predicted value and the data pertaining to the present states of usage of the rechargeable batteries 14a to 14c in the memory 28 in the measuring circuit 20. In the subsequent prediction of the remaining charge, the power management microcomputer 21 predicts the remaining charge based on the remaining charge predicted value and usage state data stored in the memory 28 in addition to the measured values supplied from the measuring circuit 20.

In such a remaining charge predicting system, the power management microcomputer 21 equipped in the portable device 11 performs prediction of the remaining charge. As this system eliminates the need for a data processing unit, such as a microcomputer, in the battery pack 12 to execute prediction of the remaining charge, therefore, the manufacturing cost for the battery pack 12 is reduced and the remaining charge is predicted accurately.

The charge control system will be discussed below in detail.

When the portable device 11 is connected to the power supply via the AC adapter 13 and charging of the battery 14 starts, the charger 22 controls the output switch 23 in such a way that the charge current $I_c$ and the charge voltage $V_c$ supplied from the AC adapter 13 become constant, while monitoring the charge current $I_c$ and the charge voltage $V_c$. That is, the charger 22 performs constant voltage and current charging on the battery 14.

At the time the battery 14 is charged, the measuring circuit 20 in the battery pack 12 detects the charge current that flows across the first sense resistor 18. Based on the current measured value received from the measuring circuit 20, the power management microcomputer 21 sets the first reference voltage $V_{ref1}$ to be applied to the error amplification circuit 32. Accordingly, the charge current value and the charge voltage value are compensated for based on the measured value of the charge current from the measuring circuit 20 and the battery 14 is charged with the compensated charge current $I_c$ and charge voltage $V_c$.

This charge control system can perform charging with constant voltage and constant current accurately and can shorten the charging time by feeding back the result of measuring the current in the battery pack 12.

The first embodiment has the following advantages.

(1) The battery pack 12 has the measuring circuit 20 that measures the charge current or discharge current, the voltages of the individual rechargeable batteries 14a to 14c and the temperature of the battery 14. The measuring circuit 20 notifies the power management microcomputer 21 of the portable device 11 of the current measured value, the voltage measured value and the temperature measured value. The power management microcomputer 21 predicts the remaining charge of the battery 14 based on those measured values. Therefore, the manufacturing cost for the battery pack 12 becomes lower and the prediction of the remaining charge is carried out accurately.

(2) Each time prediction of the remaining charge is performed, the power management microcomputer 21 stores the calculated remaining charge predicted value and data pertaining to the present states of usage of the rechargeable batteries 14a to 14c in the memory 28 of the measuring circuit 20. As the power management microcomputer 21 executes subsequent prediction of the remaining charge using the data stored in the memory 28, it is possible to carry out the prediction of the remaining charge more accurately.

(3) The AD conversion circuit 27 outputs the digital value $D_m$ of the reference voltage $A_m$ and the digital value $D_n$ of the analog input signal $A_n$. The power management microcomputer 21 computes the measured input value (the current value, the voltage value or the temperature) of the analog input signal $A_n$ by using the digital values $D_m$ and $D_n$ and the reference voltage $A_m$ without using the analog voltage $AV_{ref}$. As a high-precision analog power supply (analog voltage $AV_{ref}$) need not be provided in the AD conversion circuit 27, the AD conversion circuit 27 has a simple structure and is manufactured at a low cost. The AD conversion circuit 27 can accurately detect the current value, the voltage value and the temperature without requiring the high-precision analog voltage $AV_{ref}$.

(4) The charger 22 charges the battery 14 with the current value that reflects the current measuring result from the measuring circuit 20. Accordingly, the battery 14 is charged with a highly precise constant voltage and constant current and the charging time is shortened.

Figure 12:
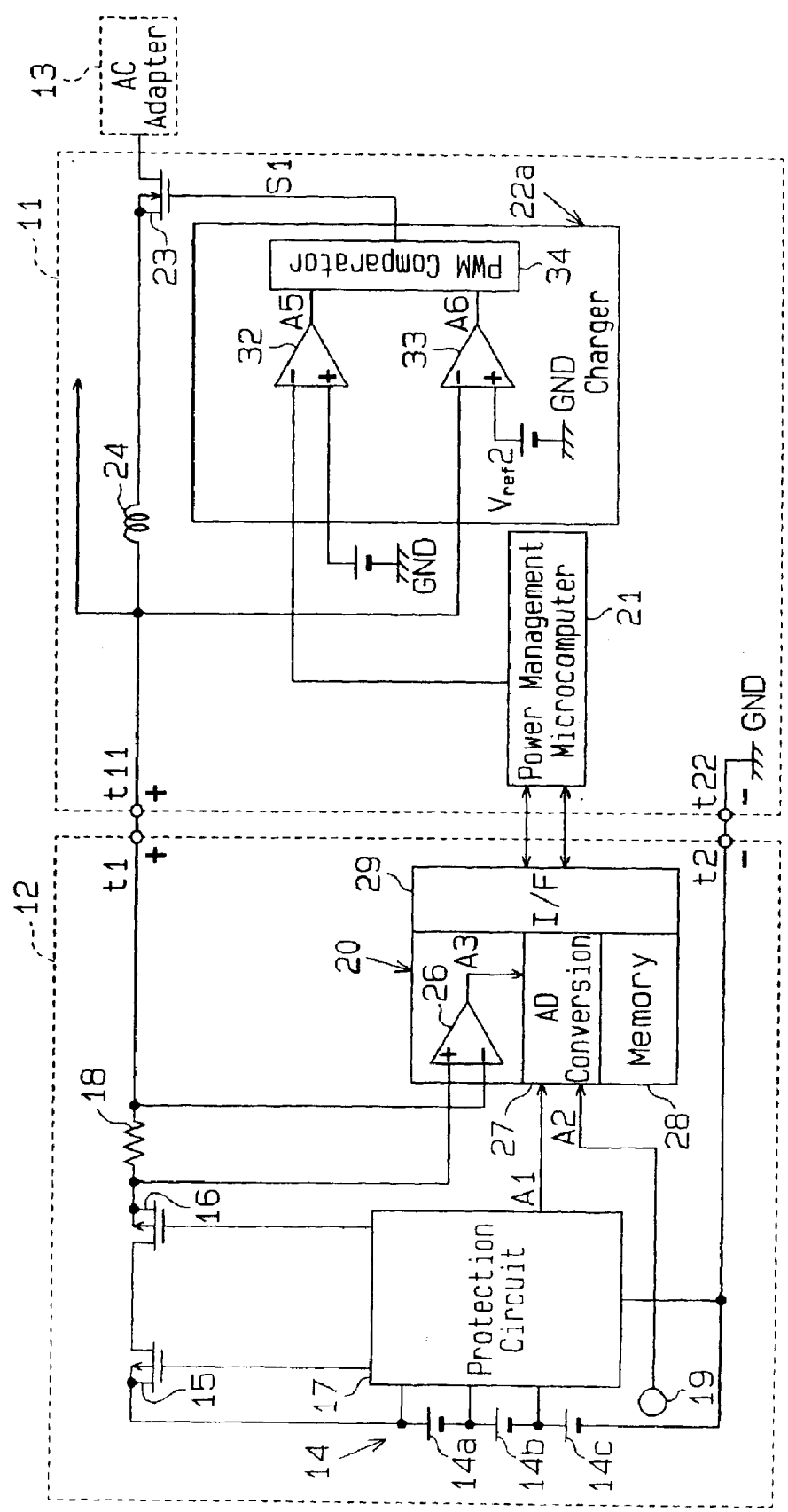
FIG. 12 shows a modification of what is shown in FIG. 8.

A modification of the first embodiment shown in FIG. 12 will be discussed next. In a charger 22a of the portable device 11, a control voltage signal from the power management microcomputer 21 is supplied to the inverting input terminal of the error amplification circuit 32. As the control voltage signal generated by the power management microcomputer 21 based on the current measuring result from the measuring circuit 20 is directly input to the error amplification circuit 32 to feed back the current measuring result in the battery pack 12 at the time of constant current control, the current sense resistor (the second sense resistor 25 in FIG. 8) of the charger 22a is omitted.

Figure 13:
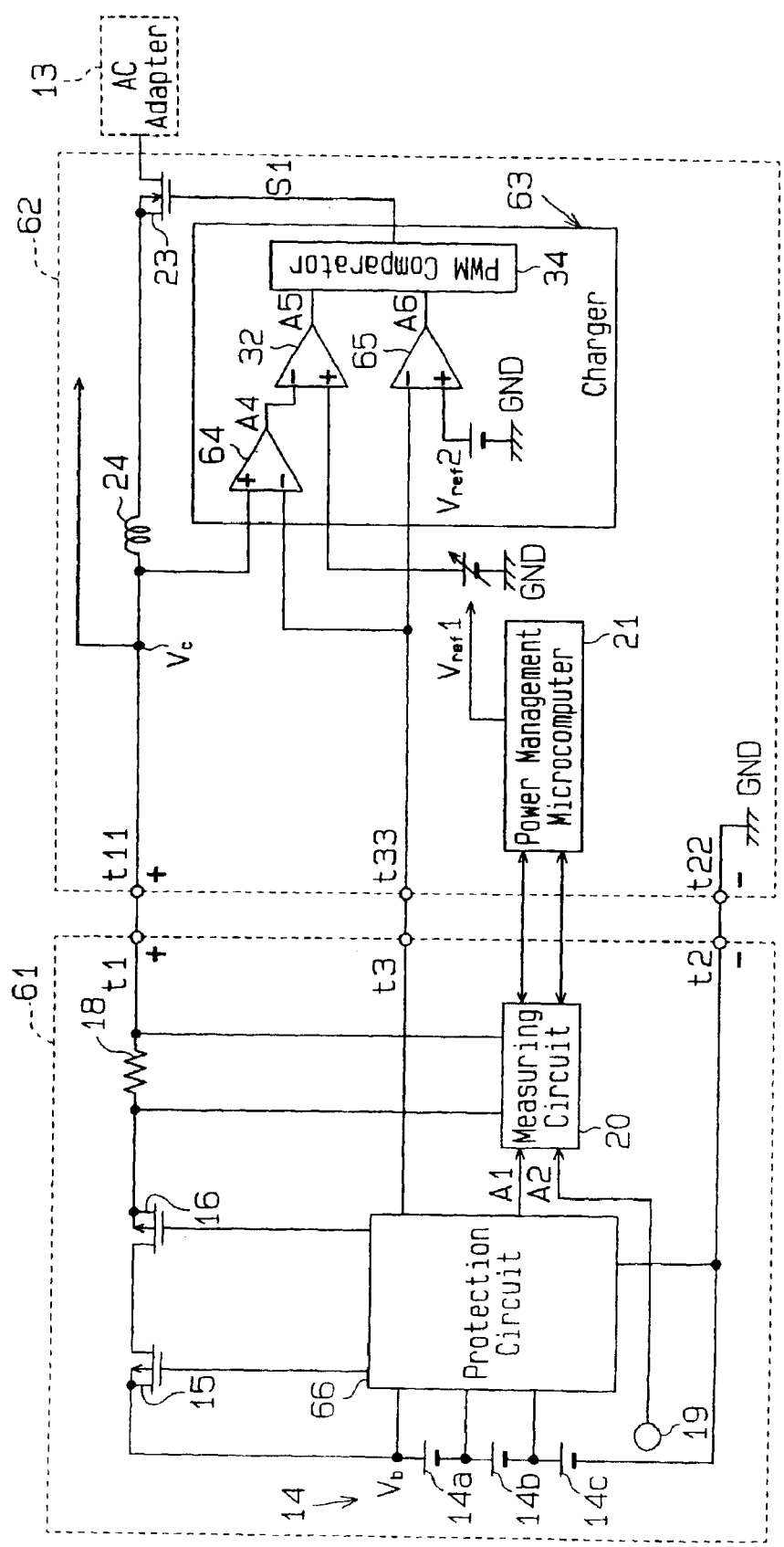
FIG. 13 is a schematic block circuit diagram of a battery pack and a portable electronic device according to a second embodiment of the present invention.

The second embodiment of the present invention will be discussed below centering on the differences from the first embodiment. As shown in FIG. 13, the second embodiment differs from the first embodiment in that a battery pack 61 has a voltage control terminal t3 as the second terminal.

The voltage control terminal t3 is connected to an input terminal t33 provided on a portable device 62. The input terminal t33 is connected to the inverting input terminals of a current detection circuit 64 and a voltage detection circuit 65 of a charger 63.

The non-inverting input terminal of the current detection circuit 64 is connected to the low-voltage terminal of the coil 24. The portable device 62 does not have the second sense resistor 25 in FIG. 8. Therefore, a signal which has approximately the same voltage as the voltage of the positive terminal t1 (first terminal) of the battery pack 61 is supplied to the non-inverting input terminal of the current detection circuit 64. The second reference voltage $V_{ref2}$ is applied to the non-inverting input terminal of the voltage detection circuit 65 as per the first embodiment.

In the battery pack 61, a protection circuit 66 detects a battery voltage $V_b$ of the battery 14, i.e., the positive battery voltage of the rechargeable battery 14a, and supplies the battery voltage $V_b$ to the voltage control terminal t3. Therefore, the battery voltage $V_b$ is applied to the inverting input terminals of the current detection circuit 64 and the voltage detection circuit 65 of the charger 63. The current detection circuit 64 provided in the charger 63 detects the charge current that flows in the battery pack 61 and supplies the current detection signal A4 having a voltage corresponding to that charge current to the error amplification circuit 32. The voltage detection circuit 65 compares the battery voltage $V_b$ with the second reference voltage $V_{ref2}$ and supplies the PWM comparator 34 with the voltage detection signal A6 which is the amplified difference between both voltages.

The charge control system for the battery pack 61 according to the second embodiment will be discussed below.

As the AC adapter 13 is connected to the portable device 62 and charging of the battery 14 starts, the charger 63 monitors the charge current flowing in the battery pack 61 and the battery voltage $V_b$ and performs constant voltage and constant current charging by controlling the output switch 23 in such a way that the current value and voltage value become constant.

At the time the battery 14 is charged, the measuring circuit 20 measures the charge current that flows across the first sense resistor 18 and notifies the power management microcomputer 21 of the measured value. Based on the current measured value, the power management microcomputer 21 sets the first reference voltage $V_{ref1}$ to be supplied to the error amplification circuit 32. Accordingly, the charger 63 performs charging with the charge current value and charge voltage value which reflect the measured value of the charge current from the measuring circuit 20. In such a charge control system, the charger 63 performs constant current and constant voltage charging based on the charge current in the battery pack 61 and the battery voltage $V_b$ and feeds back the current measuring result in the battery pack 61, so that the charger 63 can carry out constant current and constant voltage charging more accurately than the one in the first embodiment. The charging time can therefore be made shorter.

Figure 14A:
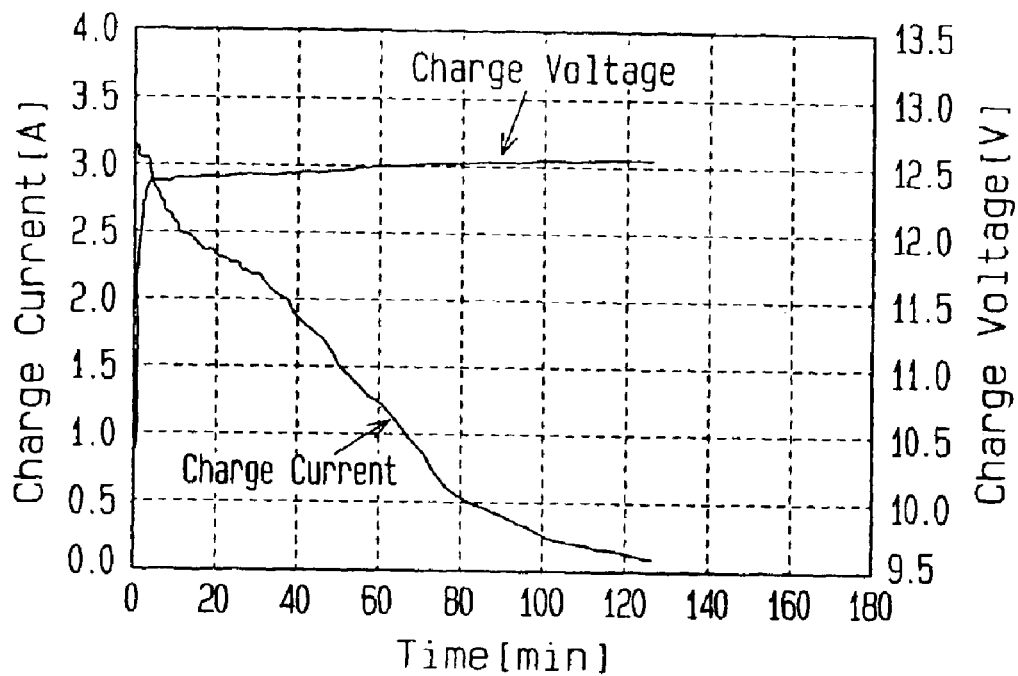
FIGS. 14A and 14B are explanatory diagrams showing the charge characteristics.

FIG. 14A shows the charge characteristic of the battery 14 according to the charge control system of the second embodiment. A set voltage at the time of charging the battery 14 with the constant voltage is 12.6 V (volts), and the rated voltage of the cell voltage of each of the rechargeable batteries 14a to 14c is 4.2 V.

As shown in FIG. 14A, the charge voltage reaches near 12.6 V immediately after charging started. After that, the battery 14 is charged toward 12.6 V by the constant voltage and constant current charging. This charging ends when the charge current becomes equal to or lower than about 1/20 of the battery capacity of the battery 14. The charger 63 charges the battery 14 with the voltage of about 12.6 V (not higher than 12.6 V) which is the set voltage value of the constant voltage charging at the beginning of charging, therefore, the charging time is shortened.

Figure 14B:
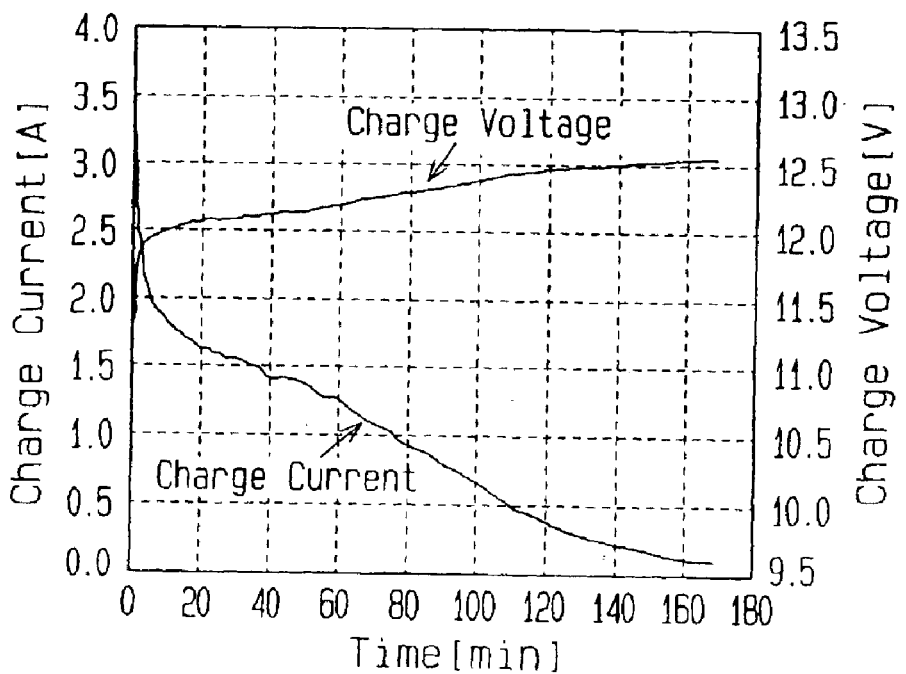

FIG. 14B shows the charge characteristic of the battery 14 that is not provided with the voltage control terminal t3. Comparing FIG. 14A with FIG. 14B, it is apparent that the charging time of the battery 14 in FIG. 14A provided with the voltage control terminal t3 is made shorter than the charging time in FIG. 14B.

In the second embodiment, the charger 63 is notified of the battery voltage $V_b$ and sets the charge voltage with respect to the battery 14 highly accurately in consideration of the voltage drop in the battery pack 61 and the impedance of the protection circuit 66. This can ensure accurate control of the amount of charging of the battery 14.

Figure 15A:
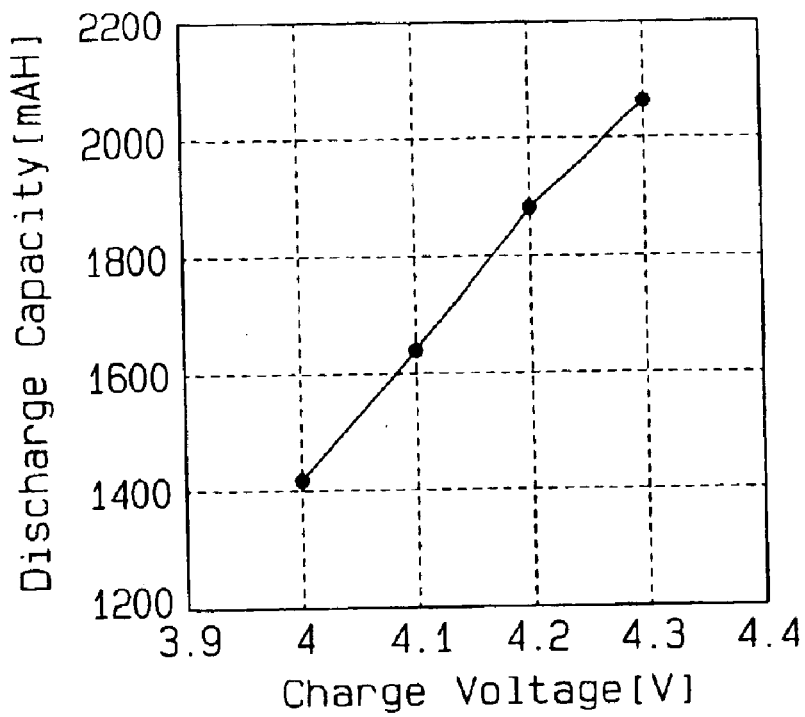
FIGS. 15A and 15B are explanatory diagrams showing the relationship between the charge voltage and discharge capacity.

A description will now be given of the relationship between the charge voltage and discharge capacity by referring to FIG. 15A. FIG. 15A shows a graph of the rechargeable battery whose rated voltage is set to 4.2 V.

Figure 15B:
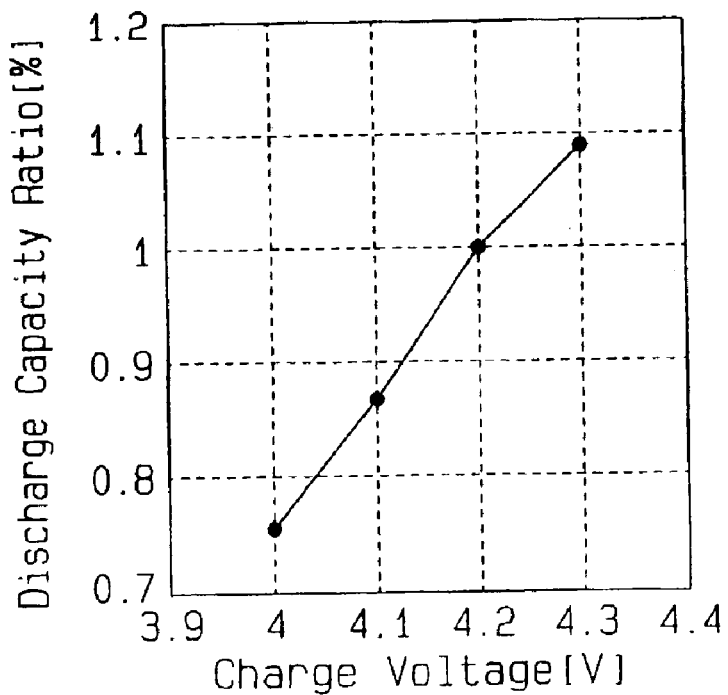

As shown in FIG. 15A, in a case where the rechargeable battery is charged with the rated voltage of 4.2 V, the discharge capacity is about 1900 mAH. When the rechargeable battery is charged with the voltage of 4.3 V higher than the rated voltage of 4.2 V, the discharge capacity increases to about 2060 mAH. When the rechargeable battery is charged with the voltage of 4.1 V lower than the rated voltage of 4.2 V, on the other hand, the discharge capacity drops to about 1640 mAH. FIG. 15B shows a discharge capacity ratio with respect to the charge voltage with "1" being the discharge capacity of about 1900 mAH that is stored when charging the battery 14 with the rated voltage of 4.2 V.

The higher the charge voltage becomes, the greater the capacity stored in the rechargeable battery becomes. In a case where charging is performed with a voltage value higher than the rated voltage of 4.2 V, however, the rechargeable battery is degraded and the cycle life becomes shorter. If the charge voltage is lower than the rated voltage of 4.2 V, on the other hand, the capacity stored in the rechargeable battery becomes smaller. It is therefore desirable that the charge voltage for the rechargeable battery should have a voltage value not exceeding the rated voltage of 4.2 V and as close to 4.2 V as possible.

In the second embodiment, the charger 63 detects the battery voltage $V_b$. As the charge voltage for the battery 14 is controlled with high precision, the charge capacity stored in the battery 14 can be made as large as possible within the specified range.

The second embodiment has the following advantages.

(1) The battery pack 61 is provided with the voltage control terminal t3 as the second terminal. This allows the current detection circuit 64 in the charger 63 to substantially detect the charge current that flows in the battery pack 61 and allows the voltage detection circuit 65 to detect the battery voltage $V_b$ of the battery 14 in consideration of the voltage drop in the battery pack 61 and the impedance of the protection circuit 66. Further, the current measuring result from the measuring circuit 20 in the battery pack 61 is reflected by the constant current control as per the first embodiment. This can ensure accurate control of the charge voltage with respect to the battery 14, so that the charging amount can be controlled accurately and the charging time can be made shorter.

(2) As the charger 63 monitors the charge current and the charge voltage in the battery pack 61 notified via the voltage control terminal t3, the second sense resistor 25 in the portable device 11 is unnecessary. This can ensure reduction in the manufacturing cost for the portable device 11 and downsizing of the portable device 11.

Figure 16:
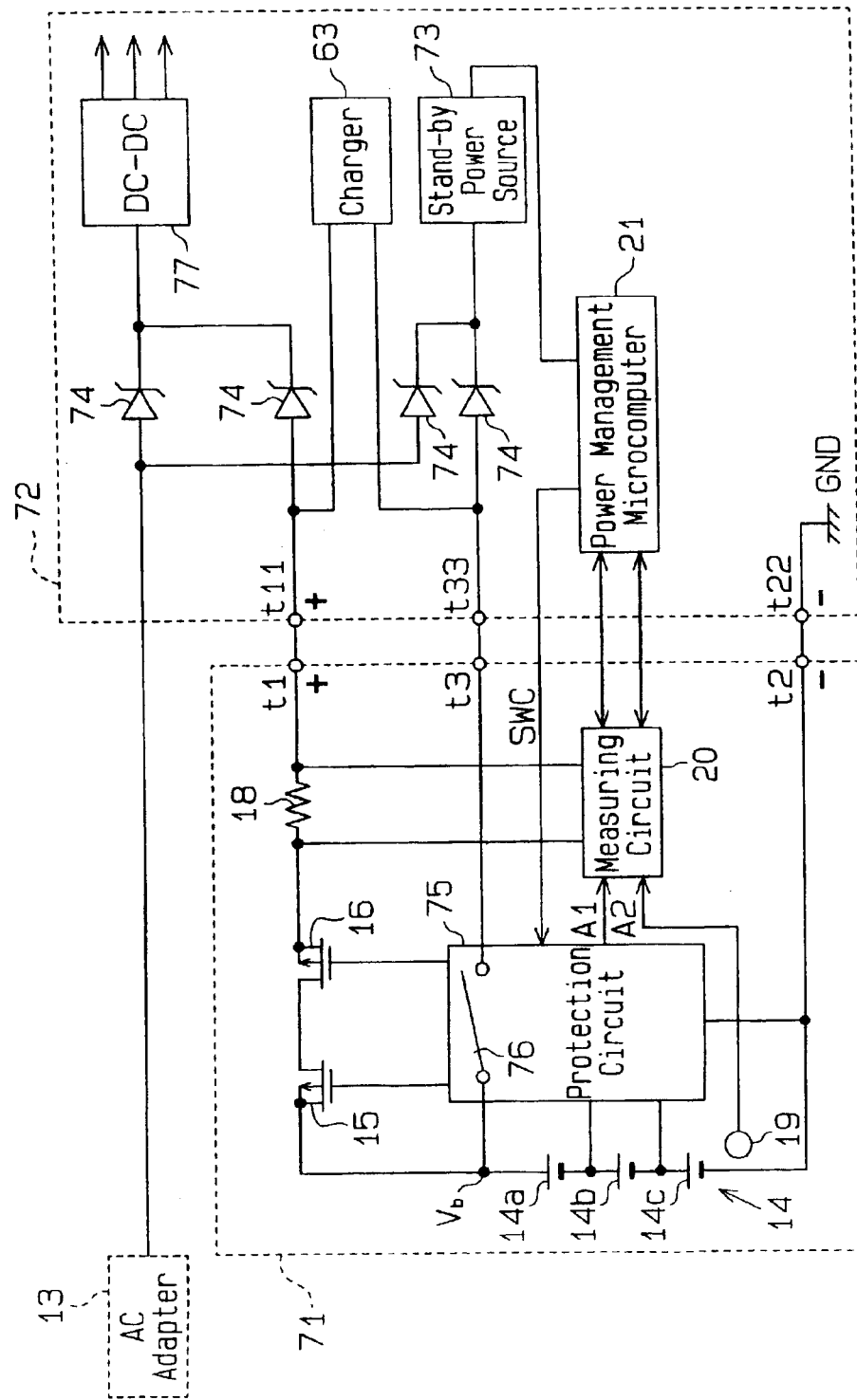
FIG. 16 is a schematic block circuit diagram of a battery pack and a portable electronic device according to a third embodiment of the present invention.

The following description of the third embodiment of the present invention will be given with respect to the differences from the second embodiment. FIG. 16 is a block circuit diagram of a battery pack 71 and a portable device 72 according to the third embodiment.

The battery pack 71 has the voltage control terminal t3 as the second terminal. The voltage control terminal t3 is connected to the inverting input terminals of the current detection circuit 64 and the voltage detection circuit 65 in the charger 63 via the input terminal t33 of the portable device 72 (see FIG. 13). The positive terminal t1 (first terminal) of the battery pack 71 is connected to the non-inverting input terminal of the current detection circuit 64 via the positive terminal t11 of the portable device 72 (see FIG. 13).

The power management microcomputer 21 provided in the portable device 72 is connected to a standby power supply 73 for supplying power when the portable device 72 is in standby mode. The standby power supply 73 is connected to the voltage control terminal t3 of the battery pack 71 via a diode 74 and the input terminal t33 of the portable device 72.

A protection circuit 75 detects the cell voltages of the individual rechargeable batteries 14a to 14c and supplies the power management microcomputer 21 with voltage measured values of the rechargeable batteries 14a to 14c which are generated based on the detection results. The power management microcomputer 21 supplies a switch control signal SWC to the protection circuit 75 based on the individual voltage measured values. The protection circuit 75 performs the ON/OFF control on the discharge control switch 15 and the charge control switch 16 in accordance with the switch control signal SWC.

The protection circuit 75 includes a standby-power-supply control switch 76 for switching the positive terminal of the battery 14 and the voltage control terminal t3 between a connected state and a non-connected state. The protection circuit 75 controls the standby-power-supply control switch 76 in accordance with the switch control signal SWC from the power management microcomputer 21. For example, the protection circuit 75 turns on the standby-power-supply control switch 76 in response to the switch control signal SWC that switches off the discharge control switch 15. In response to the switch control signal SWC that switches on the discharge control switch 15, on the other hand, the protection circuit 75 turns off the standby-power-supply control switch 76.

In the third embodiment, therefore, the protection circuit 75 serves as a standby control circuit when the portable device 72 is in standby mode. When the overdischarged state of the rechargeable batteries 14a to 14c is detected, the protection circuit 75 turns off both the discharge control switch 15 and standby-power-supply control switch 76.

With the portable device 72 in standby mode, the discharge control switch 15 is turned off and the standby-power-supply control switch 76 is turned on. In standby mode, therefore, power supply to a DC—DC converter 77 from the battery 14 is blocked, thereby preventing wasteful power consumption in the portable device 72. At this time, the battery 14 supplies only the operational power enough to drive the standby power supply 73.

When the battery 14 reaches an overdischarged state, both the discharge control switch 15 and the standby-power-supply control switch 76 are turned off in the third embodiment. This reliably prevents the battery 14 from being overdischarged.

Figure 17:
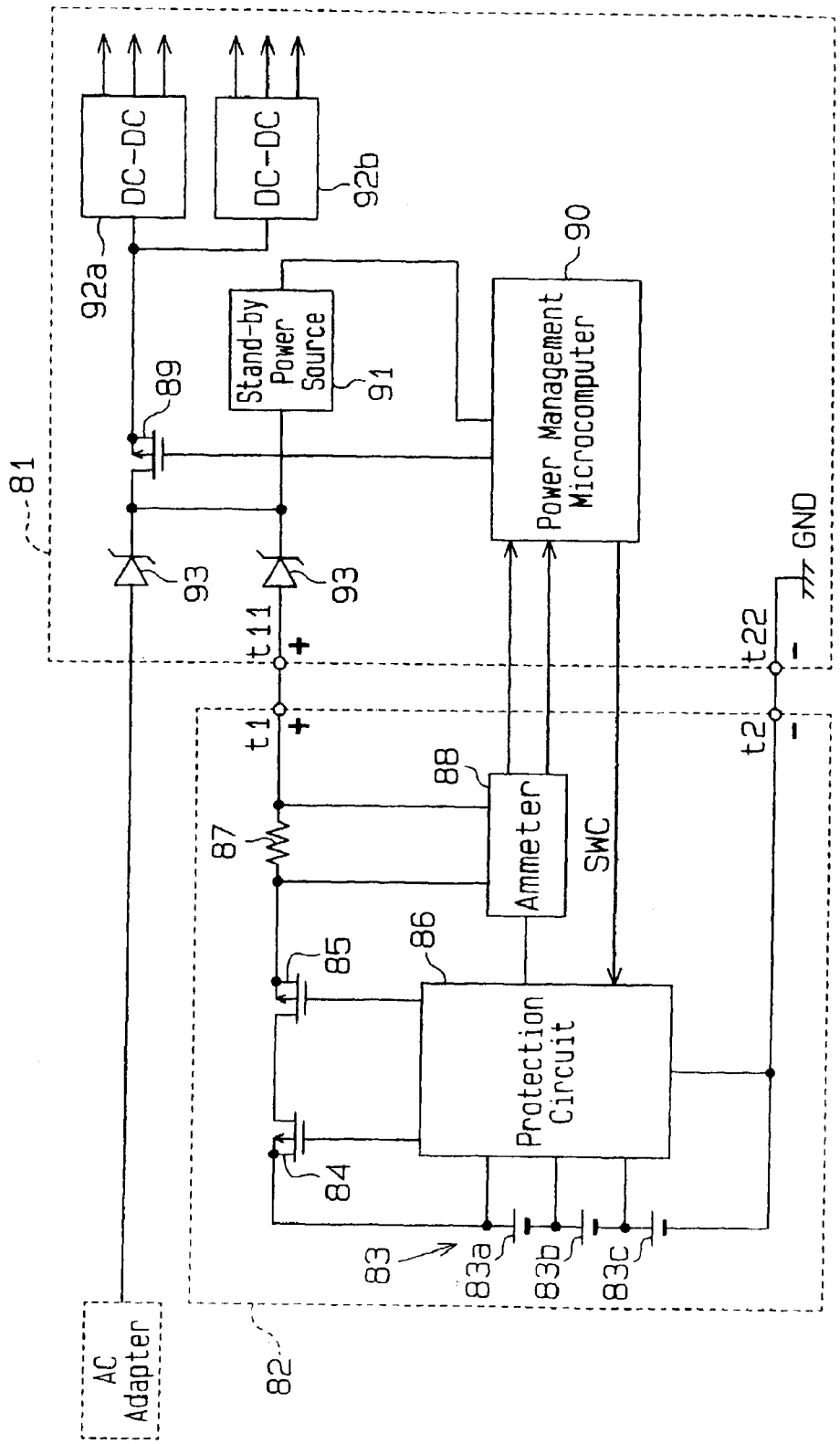
FIG. 17 is a block diagram of a comparative example with respect to what is shown in FIG. 16.

FIG. 17 shows a comparative example with respect to what is shown in FIG. 16. The charger of a portable device 81 is not shown in FIG. 17.

The portable device 81 has a built-in battery pack 82. The battery pack 82 has a battery 83, a first discharge control switch 84, a charge control switch 85, a protection circuit 86, a sense resistor 87 and an ammeter 88. The portable device 81 includes a second discharge control switch 89, a power management microcomputer 90, a standby power supply 91 and DC—DC converters 92a and 92b.

In the portable device 81, the power management microcomputer 90 is connected to the second discharge control switch 89. The discharge control switch 89 is connected to the DC—DC converters 92a and 92b. The power management microcomputer 90 is connected to the output terminal of the standby power supply 91. The input terminal of the standby power supply 91 is connected to the positive terminal t1 of the battery pack 82 via a diode 93.

The power management microcomputer 90 supplies the switch control signal SWC to the protection circuit 86 based on the current detection result supplied from the ammeter 88. The protection circuit 86 controls the ON/OFF actions of the first discharge control switch 84 and the charge control switch 85 in accordance with the switch control signal SWC. The power management microcomputer 90 controls the ON/OFF action of the second discharge control switch 89 in accordance with the control signal that has been supplied from the standby power supply 91.

With the portable device 81 in standby mode, operational power is supplied to the standby power supply 91 from the battery 83 via the first discharge control switch 84 and the charge control switch 85. In the comparison example in FIG. 17, therefore, the battery 83 supplies power even to those circuits which are not associated with the operation of the portable device 81 in standby mode, resulting in wasteful power consumption.

The third embodiment has the following advantages.

(1) The protection circuit 75 has the standby-power-supply control switch 76 which is controlled in standby mode in accordance with the switch control signal SWC supplied from the power management microcomputer 21. This structure requires no special control circuit or the like to control driving of the standby power supply 73 and can reliably prevent wasteful power consumption in the portable device 72 in standby mode while reducing the manufacturing cost by preventing an increase in the number of components required.

It should be apparent to those skilled in the art that the present invention may be embodied in many other specific forms without departing from the spirit or scope of the invention. Particularly, it should be understood that the present invention may be embodied in the following forms.

The number of the rechargeable batteries 14a to 14c that form the battery 14 is not limited to three.

Although the rechargeable batteries 14a to 14c are connected in series to one another, they may be connected in parallel or may be connected by a combination of series connection and parallel connections.

The battery pack 12, 61 or 71 may be installed or accommodated in the portable device 11, 62 or 72.

The battery pack 12, 61 or 71 may be designed to be detachable from the portable device 11, 62 or 72.

The battery pack 12, 61 or 71 may be incorporated in the portable device 11, 62 or 72. In this case, the data processing unit (21) is not provided in the battery pack 12, 61 or 71 but provided on, for example, the body of the portable device 11, which is connected to the battery pack 12, 61 or 71.

The present examples and embodiments are to be considered as illustrative and not restrictive, and the invention is not to be limited to the details given herein, but may be modified within the scope and equivalence of the appended claims.

What is claimed is:

1. A method for predicting remaining charge in at least one rechargeable battery provided in a battery pack for supplying power to a portable device, the method comprising:

measuring current flowing into or flowing out of said rechargeable battery and voltage of said rechargeable battery using a measuring unit provided in said battery pack;

sending said current and voltage data from said battery pack to said portable device; and predicting remaining charge based on said current and voltage data from said battery pack using a data processing unit provided in said portable device.

2. The method according to claim 1, further comprising notifying said data processing unit of said results of measuring said current and said voltage using said measuring unit.

3. The method according to claim 1, further comprising measuring a temperature of said rechargeable battery using said measuring unit, wherein prediction of said remaining charge is carried out based on said results of measuring said current and said voltage and a result of measuring said temperature.

4. The method according to claim 3, further comprising notifying said data processing unit of said result of measuring said temperature using said measuring unit.

5. The method according to claim 1, further comprising:
measuring a state of usage of said rechargeable battery; and
storing data pertaining to said predicted remaining charge and said state of usage of said rechargeable battery in a memory provided in said measuring unit.

6. The method according to claim 5, wherein said data pertaining to said state of usage of said rechargeable battery includes at least one of an amount of a discharge current, a total usage time and a number of charges.

7. The method according to claim 1, wherein said measuring unit includes an analog-digital conversion circuit, said method further comprising:
performing digital conversion on a reference voltage by using said analog-digital conversion circuit to generate a first digital signal;
performing digital conversion on a measured analog input signal by using said analog-digital conversion circuit to generate a second digital signal; and
supplying said first and second digital signals to said data processing unit, wherein prediction of said remaining charge includes calculating a voltage of said analog input signal from said first digital signal, and said digital signal and said reference voltage.

8. The method according to claim 7, wherein said measured analog input signal is one of a plurality of analog input signals, and digital conversion on said analog input signal includes sampling of said plurality of analog input signals.

9. The method according to claim 8, wherein said digital conversion on said analog input signal includes generation of a plurality of second digital signals by simultaneously performing digital conversion on said plurality of analog input signals, and said first digital signal and said plurality of second digital signals are sequentially output to said data processing unit.

10. The method according to claim 8, wherein said digital conversion on said analog input signal includes sequential generation of said first digital signal and a plurality of second digital signals while sequentially performing digital conversion on said plurality of analog input signals.

11. A method for controlling charging of a rechargeable battery provided in a battery pack to be connected to a portable device, the method comprising:
measuring charge current and charge voltage to be supplied to said battery pack from an external power supply using a charger provided in said portable device;
measuring current flowing into said rechargeable battery using a measuring unit provided in said battery pack;
notifying said portable device of a result of measuring said current flowing into said rechargeable battery; and
controlling said charge voltage and said charge current to be constant based on results of measuring said charge current and said charge voltage and said result of measuring said current flowing into said rechargeable battery.

12. A method for controlling charging of a rechargeable battery provided in a battery pack which is to be connected to a portable device and includes a first terminal for supplying charge current and charge voltage to said rechargeable battery from an external power supply and a second terminal for outputting a signal having a voltage nearly equal to a battery voltage of said rechargeable battery, and method comprising:
measuring a charge current flowing into said first terminal using a charger provided in said portable device;
measuring a voltage difference between a voltage at said first terminal and a voltage at said second terminal using said charger; and
controlling said charge voltage and said charge current to be constant based on results of measuring said charge current and said voltage difference.

13. A method for controlling charging of a rechargeable battery provided in a battery pack which is connectable to a portable device and includes a first terminal for supplying charge current and charge voltage to said rechargeable battery from an external power supply and a second terminal for outputting a signal having a voltage nearly equal to a battery voltage of said rechargeable battery, said method comprising:
measuring charge current flowing into said first terminal using a charger provided in said portable device;
measuring a voltage difference between a voltage at said first terminal and a voltage at said second terminal using said charger;
measuring current flowing into said rechargeable battery using a measuring unit provided in said battery pack; and
controlling said charge voltage and said charge current to be constant, by using said portable device, based on results of measuring said current flowing into said rechargeable battery, said charge current and said voltage difference.

14. A battery pack for supplying power to a portable device and having at least one rechargeable battery, the battery pack comprising:
a current detection circuit for detecting a current flowing into or flowing out of said rechargeable battery and generating an analog current detection signal;
a voltage detection circuit for detecting a voltage of said rechargeable battery and generating an analog voltage detection signal;
an analog-digital conversion circuit, connected to said current detection circuit and voltage detection circuit, for converting said current detection signal and said voltage detection signal to digital signals; and
an interface for outputting said digital signals to said portable device from the battery pack.

15. The battery pack according to claim 14, further comprising a temperature detection circuit for detecting a temperature of said rechargeable battery and generating an analog temperature detection signal, wherein said analog-digital conversion circuits converts said temperature detection signal to a digital signal which is output by said interface.

16. The battery pack according to claim 14, further comprising a memory for storing a remaining-charge predicted value supplied from said interface and data on a state of usage of said rechargeable battery.

17. The battery pack according to claim 15, wherein said analog-digital conversion circuit converts a reference voltage to a digital signal which is output by said interface.

18. The battery pack according to claim 18, wherein said analog-digital conversion circuit samples at least one of said analog voltage detection signal, said analog current detection signal and said analog temperature detection signal, and said reference voltage at a time.

19. The battery pack according to claim 18, wherein said analog-digital conversion circuit converts those signals which are sampled to digital signals which are sequentially output by said interface.

20. The battery pack according to claim 18, wherein said analog-digital conversion circuit converts those signals which are sampled to digital signals one at a time and said interface outputs said converted digital signals one at a time.

21. A semiconductor device used in a battery pack having at least one rechargeable battery, the battery pack supplying power to a portable device, the semiconductor device comprising:
- a current detection circuit for detecting a current flowing into or flowing out of said rechargeable battery and generating an analog current detection signal;
- a voltage detection circuit for detecting a voltage of said rechargeable battery and generating an analog voltage detection signal; and
- an analog-digital conversion circuit, connected to said current detection circuit and said voltage detection circuit, for converting said current detection signal and said voltage detection signal to digital; and
- an interface for outputting said digital signals to said portable device from the battery pack.

22. The semiconductor device according to claim 21, further comprising a switch connected between said rechargeable battery and one terminal of said battery pack and controlled by said voltage detection circuit.

23. A portable device which is driven by power supplied from a battery pack for supplying power to a portable device, wherein the battery pack includes a rechargeable battery, a current detection circuit for detecting a current flowing into or flowing out of said rechargeable battery and generating an analog current detection signal, a voltage detection circuit for detecting a voltage of said rechargeable battery and generating an analog voltage detection signal, an analog-digital conversion circuit, connected to said current detection circuit and said voltage detection circuit, for converting said current detection signal and said voltage detection signal to digital signals, and an interface for outputting said digital signals, the portable device comprising:
- a power-supply terminal to be connected to said battery pack;
- an interface for receiving said digital signals from the battery pack; and
- a data processing unit for predicting remaining charge of said rechargeable battery using said digital signals.

24. The portable device according to claim 23, wherein said battery pack is installed on said portable device.

25. The portable device according to claim 23, wherein said battery pack is accommodated in said portable device.

26. The portable device according to claim 23, wherein said battery pack is detachable from said portable device.

27. A method for manufacturing an apparatus for predicting remaining charge of at least one rechargeable battery provided in a battery pack for supplying a power to a portable device, the method comprising:
- providing said battery pack with a measuring unit for measuring current flowing into or flowing out of said rechargeable battery and a voltage of said rechargeable battery and an interface for outputting data of said current and voltage measured by the measuring unit to said portable device; and
- providing said portable device with a data processing unit for predicting said remaining charge of said at least one rechargeable battery based on said data of said current and voltage received from said battery pack.

* * * * *